United States Patent
Liu et al.

(10) Patent No.: US 12,025,213 B2
(45) Date of Patent: Jul. 2, 2024

(54) POWERTRAIN, DRIVE SYSTEM, AND AUTOMOBILE

(71) Applicant: Huawei Technologies Co., Ltd., Shenzhen (CN)

(72) Inventors: Fengyu Liu, Shanghai (CN); Yihong Zheng, Shanghai (CN); Gongchuan Xia, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/837,488

(22) Filed: Jun. 10, 2022

(65) Prior Publication Data

US 2022/0299096 A1 Sep. 22, 2022

Related U.S. Application Data

(63) Continuation of application No. PCT/CN2020/135217, filed on Dec. 10, 2020.

(30) Foreign Application Priority Data

Dec. 11, 2019 (CN) .......................... 201911269570.X

(51) Int. Cl.
*F16H 48/34* (2012.01)
*F16H 48/08* (2006.01)
*F16H 48/24* (2006.01)

(52) U.S. Cl.
CPC ............. *F16H 48/34* (2013.01); *F16H 48/24* (2013.01); *F16H 48/08* (2013.01); *F16H 2048/343* (2013.01)

(58) Field of Classification Search
CPC .... F16H 48/24; F16H 48/30–2048/346; B60K 23/08; B60K 17/348; B60K 17/356; F16D 2011/002; F16D 11/10; F16D 11/14; F16D 28/00
See application file for complete search history.

(56) References Cited

U.S. PATENT DOCUMENTS

| | | | | |
|---|---|---|---|---|
| 4,788,888 A * | 12/1988 | Tsutsumikoshi | ........ | F16H 48/30 180/250 |
| 5,142,940 A | 9/1992 | Hasegawa | | |
| 6,299,562 B1 * | 10/2001 | Kim | ....................... | B60K 23/08 475/221 |
| 6,966,863 B2 * | 11/2005 | Teraoka | ................. | H02K 7/108 475/154 |
| 10,514,073 B2 * | 12/2019 | Lee | ....................... | F16D 41/061 |
| 11,098,794 B2 * | 8/2021 | Yudell | ..................... | F16H 48/22 |
| 11,186,168 B1 * | 11/2021 | Kim | ..................... | B60K 17/165 |
| 11,828,355 B1 * | 11/2023 | Yang | ....................... | F16H 48/08 |

(Continued)

FOREIGN PATENT DOCUMENTS

| | | |
|---|---|---|
| CN | 101033777 A | 9/2007 |
| CN | 103619631 A | 3/2014 |

(Continued)

*Primary Examiner* — Ernesto A Suarez
*Assistant Examiner* — James J Taylor, II
(74) *Attorney, Agent, or Firm* — Conley Rose, P.C.

(57) ABSTRACT

A powertrain includes a drive motor, a gear mechanism, a left half shaft, a right half shaft, a differential, a clutch, and a clutch control component, where an output shaft of the drive motor is connected to the gear mechanism, and the gear mechanism is mounted on the differential by using a bearing.

20 Claims, 11 Drawing Sheets

(56) References Cited

U.S. PATENT DOCUMENTS

| | | |
|---|---|---|
| 2005/0040002 A1 | 2/2005 | Teraoka |
| 2012/0252621 A1 | 10/2012 | Seidl et al. |
| 2014/0135168 A1 | 5/2014 | Yokoo |
| 2015/0087476 A1 | 3/2015 | Dzafic et al. |
| 2015/0107955 A1 | 4/2015 | Tronnberg |
| 2015/0204387 A1 | 7/2015 | Holmes |
| 2017/0298996 A1 | 10/2017 | Mayr |
| 2018/0372168 A1 | 12/2018 | Baigang |
| 2019/0113119 A1 | 4/2019 | Keeney et al. |
| 2019/0316638 A1 | 10/2019 | Rupp |
| 2022/0299096 A1 | 9/2022 | Liu et al. |

FOREIGN PATENT DOCUMENTS

| | | |
|---|---|---|
| CN | 104033510 A | 9/2014 |
| CN | 104442341 A | 3/2015 |
| CN | 104565101 A | 4/2015 |
| CN | 102713357 B | 7/2015 |
| CN | 104806655 A | 7/2015 |
| CN | 205446452 U | 8/2016 |
| CN | 106915231 A | 7/2017 |
| CN | 107110232 A | 8/2017 |
| CN | 206397968 U | 8/2017 |
| CN | 206446423 U | 8/2017 |
| CN | 105346373 B | 3/2018 |
| CN | 108779821 A | 11/2018 |
| CN | 109591583 A | 4/2019 |
| CN | 109649141 A | 4/2019 |
| CN | 109690110 A | 4/2019 |
| CN | 111038240 A | 4/2020 |
| DE | 102017223350 A1 | 6/2019 |
| EP | 1142743 A2 | 10/2001 |
| EP | 3106695 A1 | 12/2016 |
| JP | 2011112114 A | 6/2011 |
| KR | 20170123869 A | 11/2017 |
| WO | 2018044493 A1 | 3/2018 |

\* cited by examiner

POWERTRAIN, DRIVE SYSTEM, AND AUTOMOBILE

CROSS-REFERENCE TO RELATED APPLICATIONS

This application is a continuation application of International Patent Application No. PCT/CN2020/135217, filed on Dec. 10, 2020, which claims priority to Chinese Patent Application No. 201911269570.X, filed on Dec. 11, 2019. The disclosures of the aforementioned applications are hereby incorporated by reference in their entireties.

TECHNICAL FIELD

Embodiments of this application relates to the field of automobile drive technologies, and furthermore, to a powertrain, a drive system, and an automobile.

BACKGROUND

A powertrain of an automobile includes a series of components mounted on the automobile that generate power and transmit the power to the road surface, including a motor, a gearbox, a shaft, a clutch, and the like.

In a related technical area, to improve a driving effect of the automobile, the powertrain may be set to a dual-motor four-wheel drive mode. This kind of powertrain includes two motors, so that a front axle and a rear axle of the automobile each are driven by one motor. For example, the front axle is driven by a front motor, and the rear axle is driven by a rear motor. Therefore, the driving effect of the automobile will be improved by means of dual-motor drive.

At least the following problem exists in the related technology.

The automobile is usually driven by a single shaft in a low-speed traveling phase or a coasting phase. For example, when the automobile is driven by the front axle, the front motor is in a running state to provide power for the automobile, and the rear motor is in an off state, but the rear axle also drives the rear motor to rotate. As a result, the rear motor brings resistance to the automobile in traveling. It can be learned that the driving effect of the powertrain is still poor.

SUMMARY

Embodiments of this application provide a powertrain, a drive system, and an automobile, to resolve a problem in a related technology. The technical solutions are as follows.

According to an aspect, a powertrain is provided, where the powertrain includes a drive motor, a gear mechanism, a left half shaft, a right half shaft, a differential, a clutch, and a clutch control component. An output shaft of the drive motor is in transmission connection to the gear mechanism, and the gear mechanism is mounted on the differential by using a bearing. The left half shaft is in transmission connection to a left gear located in the differential, and the right half shaft is in transmission connection to a right gear located in the differential. A driving plate of the clutch is located between the gear mechanism and the differential, is fixedly mounted on the gear mechanism, and is sleeved on an outer surface of a housing of the differential. A driven plate of the clutch is slidably sleeved on the outer surface of the housing of the differential, and a sliding direction of the driven plate relative to the differential is an axial direction of the differential.

The clutch control component is mounted on the driven plate and configured to control the driven plate to slide in a direction close to the driving plate on the housing of the differential, to combine the driven plate with the driving plate, so as to enable power transmission between the drive motor and the differential; and control the driven plate to slide in a direction away from the driving plate on the housing of the differential, to separate the driven plate from the driving plate, so as to disable power transmission between the drive motor and the differential.

In the solution shown in this embodiment of this application, the power transmission between the gear mechanism and the differential is disabled by using the bearing, and the clutch is mounted between the gear mechanism and the differential, so that the gear mechanism and the differential can be combined and separated. The driving plate of the clutch is fastened to the gear mechanism. For example, the driving plate is fastened to a large gear of the gear mechanism, and the driven plate of the clutch is sleeved on the housing of the differential, and can slide axially on the housing of the differential. The clutch control component is configured to control the driven plate to slide axially on the housing of the differential, so that the driven plate is combined with or separated from the driving plate.

In this way, when an automobile is running and the drive motor is required to provide driving power, the clutch control component may control the driven plate to slide to the driving plate, so that the clutch is in a jointed state. Further, the drive motor can transfer power to the left half shaft and the right half shaft, to drive the automobile. In a coasting phase of the automobile, when the drive motor is not required to drive the automobile to run, the drive motor may be in a closed state, and the clutch control component may control the driven plate to slide away from the driving plate, so that the clutch is in a separated state. In this state, although the left half shaft and the right half shaft rotate, because the driven plate is separated from the driving plate, the driven plate cannot transfer power to the driving plate, and does not transfer power to the drive motor through the differential and the gear mechanism, so that the drive motor does not act as resistance.

It can be seen from the above that, when the drive motor is required to provide power, the clutch is in the jointed state, and transmits power of the drive motor to the left half shaft and the right half shaft. When the drive motor is not required to provide power, the clutch is in the separated state, and the left half shaft and the right half shaft are blocked from transmitting power to the drive motor, so that the drive motor can be prevented from blocking driving of the automobile as resistance. It can be learned that the powertrain having this structure can improve a driving effect of the powertrain.

In a possible implementation, the clutch control component includes an annular sliding member and an actuator motor, the annular sliding member is mounted on the driven plate, and the annular sliding member is rotatably mounted on an output shaft of the actuator motor.

In the solution shown in this embodiment of this application, when the actuator motor rotates in a first rotation direction, the clutch control component controls, by using the annular sliding member, the driven plate to slide in the direction close to the driving plate on the housing of the differential, to combine the driving plate with the driven plate, so as to enable power transmission between the drive motor and the differential. When the actuator motor rotates in a second rotation direction, the clutch control component controls, by using the annular sliding member, the driven plate to slide in the direction away from the driving plate on the housing of the differential, to separate the driving plate from the driven plate, so as to disable power transmission between the drive motor and the differential, where the second rotation direction is opposite to the first rotation direction.

In a possible implementation, the annular sliding member includes a first ring, an arc-shaped shift fork, and a sliding block. An arc-shaped groove is provided on an outer surface of the first ring along a circumferential direction, and the arc-shaped shift fork adapts to the arc-shaped groove. The first ring is sleeved on an outer surface of the driven plate, the arc-shaped shift fork is mounted in the arc-shaped groove, the arc-shaped shift fork is fastened to the sliding block, and the sliding block is rotatably mounted on the output shaft of the actuator motor.

In the solution shown in this embodiment of this application, the arc-shaped shift fork is configured to convert a rotational motion of the actuator motor into a translational motion. In one embodiment, the arc-shaped shift fork is fastened to the sliding block, the sliding block is provided with a screw hole with an inner thread, and the output shaft of the actuator motor is provided with an external thread. In this way, in a rotation process of the output shaft of the actuator motor, the translational motion may occur on the arc-shaped shift fork. The arc-shaped groove matching the arc-shaped shift fork may be provided on the outer surface of the first ring along a circumferential direction, so that the arc-shaped shift fork may be clamped in the arc-shaped groove of the first ring. Further, in the rotation process of the actuator motor, the arc-shaped shift fork can slide axially with the first ring. The first ring is mounted with the driven plate. Further, the first ring can slide axially with the driven plate.

In a possible implementation, the annular sliding member includes a first ring, a second ring, and a third ring. A first beveled protrusion and a circumferential limiting structure are disposed on an outer surface of the first ring along a circumferential direction, and a second beveled protrusion is disposed on an inner surface of the second ring along a circumferential direction. The first beveled protrusion of the first ring adapts to the second beveled protrusion of the second ring, an axial rack is disposed on the outer surface of the second ring, and an axial rack is disposed on an outer surface of the third ring. The first ring is sleeved on an outer surface of the driven plate, a plane bearing is mounted between the first ring and the driven plate, and the second ring is sleeved on the outer surface of the first ring. The axial rack of the second ring is engaged with the axial rack of the third ring, and the third ring is mounted on the output shaft of the actuator motor. The first ring rotates along a circumferential direction in a limited state and slides in the axial direction in a free state through the circumferential limiting structure and cooperation between the first beveled protrusion of the first ring, and the second beveled protrusion of the second ring.

In the solution shown in embodiments of this application, as shown in FIG. 8 and FIG. 9 with reference to FIG. 5 and FIG. 6, when the actuator motor rotates in a first rotation direction, the third ring rotates with rotation of the output shaft, to drive the second ring to rotate. Because the first ring is limited by the circumferential limiting structure in the circumferential direction, the first ring cannot perform a rotational motion. In this way, in a rotation process of the second ring, the second beveled protrusion of the second ring pushes the first beveled protrusion of the first ring, so that the first ring slides axially and slides to a direction in which the driving plate is located. In an axially sliding process of the first ring, a first annular protrusion on the driven plate is located in an annular groove of the first ring, so that the first ring may push the driven plate to a location of the driving plate, to combine the driving plate with the driven plate.

Similarly, when the actuator motor rotates in a second rotation direction, the third ring rotates with rotation of the output shaft, to drive the second ring to rotate. Because the first ring is limited by the circumferential limiting structure in the circumferential direction, the first ring cannot perform a rotational motion. In this way, in the rotation process of the second ring, the second beveled protrusion of the second ring pushes the first beveled protrusion of the first ring, so that the first ring slides axially and slides away from the direction in which the driving plate is located. In the axially sliding process of the first ring, the first annular protrusion on the driven plate is located in the annular groove of the first ring, so that the first ring may push the driven plate away from the location of the driving plate, to separate the driving plate from the driven plate.

In a possible implementation, a first annular protrusion is disposed in a circumferential direction of the outer surface of the driven plate, an annular groove is disposed in a circumferential direction of an inner surface of the first ring, the first annular protrusion is located in the annular groove, and the plane bearing is mounted between a side wall of the first annular protrusion and a groove wall of the annular groove.

In the solution shown in this embodiment of this application, as shown in FIG. 7, one plane bearing is mounted between one side wall of the first annular protrusion of the driven plate and one groove wall of the annular groove of the first ring, and one plane bearing is mounted between the other side wall of the first annular protrusion of the driven plate and the other groove wall of the annular groove of the first ring. In an example, the two plane bearings are mounted between the driven plate and the first ring, so that the driven plate may rotate in the circumferential direction relative to the first ring. Further, the driven plate may rotate in the circumferential direction, and the first ring may also be limited in the circumferential direction, and cannot rotate in the circumferential direction.

In a possible implementation, the clutch control component further includes an elastic member, a first end of the elastic member abuts against the driven plate, and a second end of the elastic member abuts against the housing of the differential. The elastic member is configured to control the driving plate and the driven plate to maintain in the jointed state or the separated state.

In the solution shown in this embodiment of this application, one end of the elastic member abuts against the driven plate, and the other end of the elastic member abuts against the housing of the differential. Alternatively, one end of the elastic member may abut against the first ring, and the other end of the elastic member abuts against the housing of the differential. A mounting manner of the elastic member and whether the elastic member is in a compressed state or a stretched state are not in one embodiment limited in this embodiment, and provided that the elastic member can maintain the driven plate and the driving plate in the jointed state, or the elastic member can maintain the driven plate and the driving plate in the separated state.

In this way, even if the actuator motor is faulty and cannot work, under an elastic force of the elastic member, the driven plate can still enable the clutch to be in the jointed state or in the separated state, so that the clutch is not in an intermediate state between the jointed state and the separated state. In this way, security of the powertrain can be improved.

In a possible implementation, if the elastic member is configured to control the driving plate and the driven plate to maintain in the jointed state, the actuator motor is configured to be in a running state when the driving plate and the driven plate are in the separated state, to control the driving plate and the driven plate to maintain in the separated state. If the elastic member is configured to control the driving plate and the driven plate to maintain in the separated state, the actuator motor is configured to be in the running state when the driving plate and the driven plate are in the jointed state, to control the driving plate and the driven plate to maintain in the jointed state.

In the solution shown in this embodiment of this application, if the elastic force of the elastic member enables the driving plate and the driven plate to maintain in the jointed state, when the driving plate and the driven plate need to be in the separated state, the actuator motor may be enabled to be in the running state to overcome the elastic force of the elastic member, so as to maintain the driving plate and the driven plate in the separated state. If the elastic force of the elastic member enables the driving plate and the driven plate to maintain in the separated state, when the driving plate and the driven plate need to be in the jointed state, the actuator motor may be enabled to be in the running state to overcome the elastic force of the elastic member, so as to maintain the driving plate and the driven plate in the jointed state.

In a possible implementation, the clutch is a claw type clutch, and claw teeth are disposed on end surfaces that are of the driving plate and the driven plate and that face each other. When the claw teeth of the driving plate are engaged with the claw teeth of the driven plate, the driving plate and the driven plate are in the jointed state. When the claw teeth of the driving plate are not in contact with the claw teeth of the driven plate, the driving plate and the driven plate are in the separated state.

In the solution shown in this embodiment of this application, the clutch may be a claw type clutch. In one embodiment, as shown in FIG. 2, the claw teeth may be disposed on end surfaces that are of the driving plate and the driven plate and that face each other. When the claw teeth of the driving plate are engaged with the claw teeth of the driven plate, the driving plate and the driven plate are in the jointed state. In this case, the clutch is in the jointed state, and the power transmission between the drive motor and the differential can be enabled. When the claw teeth of the driving plate are not in contact with the claw teeth of the driven plate, the driving plate and the driven plate are in the separated state. In this case, the clutch is in the separated state, and the power transmission between the drive motor and the differential can be disabled.

In a possible implementation, an axial chute is disposed on the housing of the differential, an axial protrusion is disposed on an inner wall of the driven plate, and the driven plate is sleeved on the housing of the differential through cooperation between the axial protrusion and the axial chute.

In the solution shown in this embodiment of this application, the driven plate may be sleeved on the housing of the differential, and the axial protrusion of the driven plate is located in the axial chute of the housing of the differential. In this way, the driven plate can slide in the direction close to the driving plate and in the direction away from the driving plate on the housing of the differential.

According to another aspect, a drive system is provided, where the drive system includes at least one powertrain according to the first aspect.

In the solution shown in this embodiment of this application, the drive system may include at least one powertrain described above. For example, a dual-motor four-wheel drive system driven by two drive motors may include two powertrains described above, and a drive system driven by more than two drive motors may include a plurality of powertrains described above.

According to another aspect, an automobile is provided. The automobile may include the foregoing drive system, and the drive system may include at least one powertrain described above.

The technical solutions provided in embodiments of this application bring the following beneficial effects.

In embodiments of this disclosure, the clutch is mounted between the gear mechanism and the differential of the powertrain. When the drive motor is used as a power source to drive the automobile to run, the driven plate of the clutch may slide to the driving plate, so that the clutch is in the jointed state, and the drive motor can transfer power to the left half shaft and the right half shaft to drive the automobile to run. When the automobile is in the coasting phase and the drive motor is not required to drive the automobile to run, the driven plate of the clutch slides away from the driving plate, so that the clutch is in the separated state. In this state, although the left half shaft and the right half shaft are in a rotating state, because the clutch disables power transmission between the drive motor and the differential, the left half shaft and the right half shaft can be blocked from transmitting power to the drive motor, so that the drive motor can be prevented from blocking driving of the automobile as resistance. It can be learned that the powertrain having this structure can improve a driving effect of the powertrain.

| Illustrative descriptions | |
|---|---|
| 1. Drive motor | 2. Gear mechanism |
| 3. Left half shaft | 4. Right half shaft |
| 5. Differential | 6. Clutch |
| 7. Clutch control component | 8. Bearing |
| 9. Plane bearing | |
| 21. Large gear | 51. Axial chute |
| 61. Driving plate | 62. Driven plate |
| 63. Axial protrusion | 71. Annular sliding member |
| 72. Actuator motor | 73. Elastic member |
| 711. First ring | 712. Arc-shaped shift fork |
| 713. Sliding block | 714. Arc-shaped groove |
| 715. Second ring | 716. Third ring |
| 621c. First annular protrusion | 711a. First beveled protrusion |
| 711b. Circumferential limiting structure | 711c. Annular groove |
| 711d. Second annular protrusion | 715a. Second beveled protrusion |

DESCRIPTION OF EMBODIMENTS

Embodiments of this application provide a powertrain of an automobile. The automobile may be a single-motor drive automobile, or a dual-motor four-wheel drive automobile. The single-motor drive automobile may include one powertrain, and the dual-motor drive automobile may include two powertrains.

Figure 1:
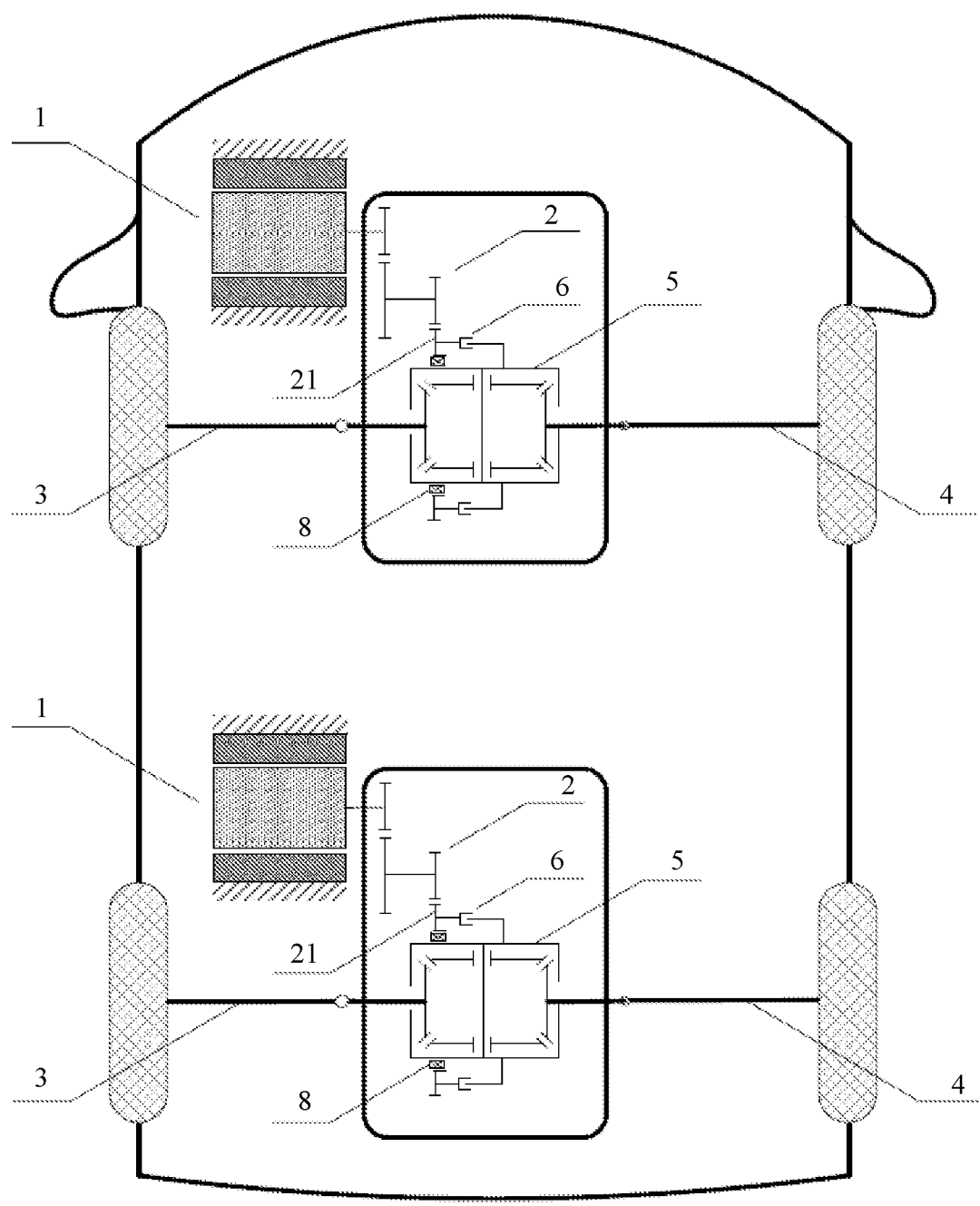
FIG. 1 is a schematic diagram of a structure of an automobile according to an embodiment of this application.
Figure 2:
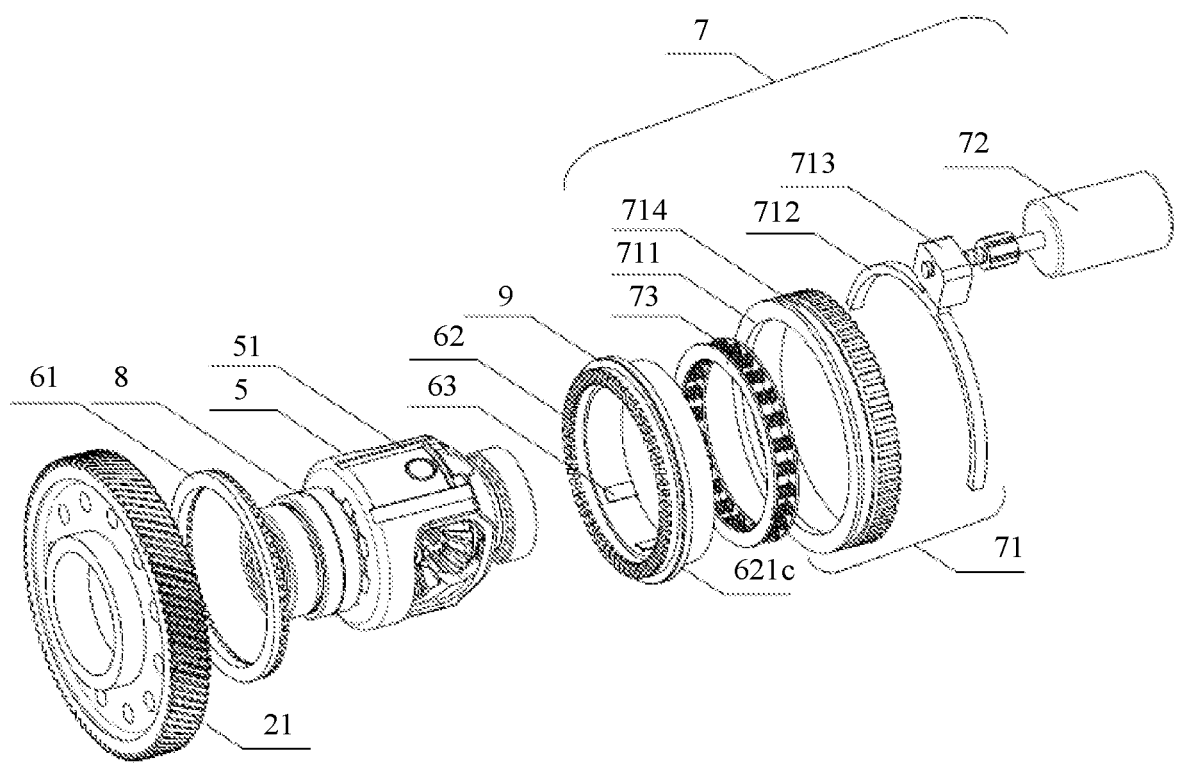
FIG. 2 is a schematic diagram of a split structure of a normally closed powertrain according to an embodiment of this application.

As shown in FIG. 1 with reference to FIG. 2, the powertrain may include a drive motor 1, a gear mechanism 2, a left half shaft 3, a right half shaft 4, a differential 5, a clutch 6, and a clutch control component 7. As shown in FIG. 1, an output shaft of the drive motor 1 is in transmission connection to the gear mechanism 2, and the gear mechanism 2 is mounted on the differential 5 by using a bearing 8. For example, as shown in FIG. 2, a large gear 21 of the gear mechanism 2 is mounted on the differential 5 by using the bearing 8. The left half shaft 3 is in transmission connection to a left gear located in the differential 5, and the right half shaft 4 is in transmission connection to a right gear located in the differential 5. As shown in FIG. 2, a driving plate 61 of the clutch 6 is located between the gear mechanism 2 and the differential 5, is fixedly mounted on the gear mechanism 2, and is sleeved on an outer surface of a housing of the differential 5. As shown in FIG. 2, a driven plate 62 of the clutch 6 is slidably sleeved on the outer surface of the housing of the differential 5, and a sliding direction of the driven plate 62 relative to the differential 5 is an axial direction of the differential 5.

The clutch control component 7 is a component capable of controlling the driving plate 61 and the driven plate 62 to be combined or separated, is mounted on the driven plate 62, and is mainly configured to control the driven plate 62 to slide in a direction close to the driving plate 61 on the housing of the differential 5, to engage the driving plate 61 with the driven plate 62, so as to pass on power output from the drive motor 1 to the differential 5; and control the driven plate 62 to slide in a direction away from the driving plate 61 on the housing of the differential 5, to disengage the driving plate 61 from the driven plate 62, so as to disconnect the power output transmitted from the drive motor 1 to the differential 5.

The gear mechanism 2 is a speed reducing gear mechanism, and may also be referred to as a reducer. The gear mechanism 2 may include the large gear 21 shown in FIG. 2. After being in transmission connection to another gear in the gear mechanism 2, the large gear 21 is mounted on an output shaft of the drive motor 1. The drive motor 1 is the power source of the powertrain.

The left half shaft 3 and the right half shaft 4 are drive shafts of the powertrain. If the left half shaft 3 and the right half shaft 4 are mounted in front part of the automobile, the left half shaft 3 and the right half shaft 4 form a front axle. If the left half shaft 3 and the right half shaft 4 are mounted in rear part of the automobile, the left half shaft 3 and the right half shaft 4 form a rear axle. The left half shaft 3 is mounted with a left wheel hub of the automobile, and the right half shaft 4 is mounted with a right wheel hub of the automobile.

The differential 5 is a mechanism that enables the left half shaft 3 and the right half shaft 4 to rotate at different rotational speeds respectively, it includes a left gear connected to the left half shaft 3, and a right gear connected to the right half shaft 4.

In one embodiment, as shown in FIG. 2, the differential 5 may have columnar shape, for example, it may have a stepped columnar shape. Diameter of the columnar shape in the middle is greater than diameters of the columnar shape at two ends, and the columnar shaper at two ends of the differential 5 may be referred to as stepped shafts of the differential 5. The two ends of the differential 5 may be mounted and fixed by using a bearing respectively, for example, may be fixedly mounted on a differential mounting base.

The clutch 6 is a mechanism capable of connecting and disconnecting power transmission between the drive motor 1 and the differential 5, and mainly includes the driving plate 61 and the driven plate 62.

In one embodiment, the clutch 6 may be a claw type clutch. In one embodiment, as shown in FIG. 2, claw teeth may be disposed on end surfaces that are of the driving plate 61 and the driven plate 62 and that face each other. When the claw teeth of the driving plate 61 are engaged with the claw teeth of the driven plate 62, the driving plate 61 and the driven plate 62 are in a jointed state. In this case, the clutch 6 is in the jointed state, and the power transmission between the drive motor 1 and the differential 5 can be connected. When the claw teeth of the driving plate 61 are not in contact with the claw teeth of the driven plate 62, the driving plate 61 and the driven plate 62 are in a separated state. In this case, the clutch 6 is in the separated state, and the power transmission between the drive motor 1 and the differential 5 can be disconnected.

In one embodiment, a mounting relationship between the clutch 6 and the differential 5 may be shown in FIG. 2. The driving plate 61 may be located between the large gear 21 and the differential 5 of the gear mechanism 2, is fixedly mounted on the large gear 21, and is sleeved on the housing of the differential 5, and the large gear 21 is mounted on the stepped shaft of the differential 5 by using the bearing 8. In this way, the gear mechanism 2 and the differential 5 may relatively rotate by using the bearing 8. That is, rotation of the large gear 21 does not drive the differential 5 to rotate, and rotation of the differential 5 does not drive the large gear 21 to rotate. However, the power transmission between the large gear 21 and the differential 5 may be correspondingly implemented by using the clutch 6 as follows.

The driven plate 62 is slidably mounted on the housing of the differential 5, where the sliding direction of the driven plate 62 relative to the differential 5 is the axial direction of the differential 5. The driven plate 62 may be slidably mounted on the housing of the differential 5 in the following manner. As shown in FIG. 2, the housing of the differential 5 is provided with an axial chute 51, an axial protrusion 63 is disposed on an inner wall of the driven plate 62, and the driven plate 62 is slidably sleeved on the housing of the differential 5 through cooperation between the axial protrusion 63 and the axial chute 51. The driven plate 62 may be sleeved on the housing of the differential 5, and the axial protrusion 63 of the driven plate 62 is located in the axial chute 51 of the housing of the differential 5. In this way, the driven plate 62 can slide in the direction close to the driving plate 61 and in the direction away from the driving plate 61 on the housing of the differential 5.

When the driven plate 62 slides in the direction close to the driving plate 61 until the driving plate 61 is engaged with the driven plate 62, and when the large gear 21 drives the driving plate 61 to rotate, the driven plate 62 may be driven to rotate. When the driven plate 62 rotates, the driven plate 62 may also drive the housing of the differential 5 to rotate through cooperation between the axial protrusion 63 and the axial chute 51. When the housing of the differential 5 rotates, the left gear connected to the left half shaft 3 and the right gear connected to the right half shaft 4 inside may be driven to rotate. Further, the gear mechanism 2 may transfer power to the left half shaft 3 and the right half shaft 4 through the differential 5.

When the driven plate 62 slides in the direction away from the driving plate 61 until the driving plate 61 is separated from the driven plate 62, even if the left half shaft 3 and the right half shaft 4 rotate, because the driven plate 62 is separated from the driving plate 61, the driven plate 62 cannot transfer power to the driving plate 61. Further, even if the left half shaft 3 and the right half shaft 4 rotate, the driven plate 62 does not transfer power to the drive motor 1 through the differential 5 and the gear mechanism 2.

The clutch control component 7 may be mounted on the driven plate 62, and is configured to control sliding of the driven plate 62 on the housing of the differential 5. In one embodiment, the clutch control component 7 may control the driven plate 62 to slide in the direction close to the driving plate 61 on the housing of the differential 5, to combine the driving plate 61 with the driven plate 62, so as to enable power transmission between the drive motor 1 and the differential 5. The clutch control component 7 may control the driven plate 62 to slide in the direction away from the driving plate 61 on the housing of the differential 5, to separate the driving plate 61 from the driven plate 62, so as to disable power transmission between the drive motor 1 and the differential 5.

In this way, when an automobile is running and the drive motor 1 is required to provide driving power, the clutch control component 7 may control the driven plate 62 to slide to the driving plate 61, so that the clutch 6 is in the jointed state. Further, the drive motor 1 can transfer power to the left half shaft 3 and the right half shaft 4, to drive the automobile. In a coasting phase of the automobile, when the drive motor 1 is not required to drive the automobile to run, the drive motor 1 may be in a closed state, and the clutch control component 7 may control the driven plate 62 to slide away from the driving plate 61, so that the clutch 6 is in the separated state. In this state, although the left half shaft 3 and the right half shaft 4 rotate, because the driven plate 62 is separated from the driving plate 63, the driven plate 62 cannot transfer power to the driving plate 61, and does not transfer power to the drive motor 1 through the differential 5 and the gear mechanism 2, so that the drive motor does not act as resistance.

It can be seen from the above that, when the drive motor is required to provide power, the clutch is in the jointed state, and transmits power of the drive motor to the left half shaft and the right half shaft. When the drive motor is not required to provide power, the clutch is in the separated state, and the left half shaft and the right half shaft are blocked from transmitting power to the drive motor, so that the drive motor can be prevented from blocking driving of the automobile as resistance. It can be learned that the powertrain having this structure can improve a driving effect of the powertrain.

In one embodiment, the clutch control component 7 may be a telescopic rod component. The telescopic rod component is fixed on the driven plate 62, and may pull or push the driven plate 62 to slide axially on the outer surface of the housing of the differential 5.

In one embodiment, the clutch control component 7 may alternatively be an actuator motor component. When the actuator motor rotates, the driven plate 62 may be pulled or pushed to slide axially on the housing of the differential 5. In this case, the physical structure of the clutch control component 7 may include, as shown in FIG. 2, an annular sliding member 71 and an actuator motor 72. The annular sliding member 71 is mounted on the driven plate 62, and the annular sliding member 71 is rotatably mounted on an output shaft of the actuator motor 72.

The actuator motor 72 is the power source that enables the driven plate 62 to slide axially on the housing of the differential 5.

In one embodiment, the annular sliding member 71 is mounted on the output shaft of the actuator motor 72. In a rotation process of the actuator motor 72, the actuator motor 72 may drive the annular sliding member 71 to slide axially, and the annular sliding member 71 is mounted on the driven plate 62. Therefore, the annular sliding member 71 may drive the driven plate 62 to slide axially. In this way, the clutch control component 7 may be functionally configured to, when the actuator motor 72 rotates in a first rotation direction, control, by using the annular sliding member 71, the driven plate 62 to slide in the direction close to the driving plate 61 on the housing of the differential 5, to engage the driving plate 61 with the driven plate 62, so as to enable power transmission between the drive motor 1 and the differential 5; and when the actuator motor 72 rotates in a second rotation direction, control, by using the annular sliding member 71, the driven plate 62 to slide in the direction away from the driving plate 61 on the housing of the differential 5, to separate the driving plate 61 from the driven plate 62, so as to disable power transmission between the drive motor 1 and the differential 5, where the second rotation direction is opposite to the first rotation direction.

The annular sliding member 71 may have a plurality of structures. For example, a possible structure may be shown in FIG. 2 with reference to FIG. 3. The annular sliding member 71 may include a first ring 711, an arc-shaped shift fork 712, and a sliding block 713, an arc-shaped groove 714 is provided on an outer surface of the first ring 711 along a circumferential direction, and the arc-shaped shift fork 712 adapts to the arc-shaped groove 714. The first ring 711 is sleeved on an outer surface of the driven plate 62, the arc-shaped shift fork 712 is mounted in the arc-shaped groove 714, the arc-shaped shift fork 712 is fastened to the sliding block 713, and the sliding block 713 is rotatably mounted on the output shaft of the actuator motor 72.

In one embodiment, the arc-shaped shift fork 712 is configured to convert a rotational motion of the actuator motor 72 into a translational motion. In one embodiment, the arc-shaped shift fork 712 is fastened to the sliding block 713, the sliding block 713 is provided with a screw hole with an inner thread, and the output shaft of the actuator motor 72 is provided with an external thread. In this way, in a rotation process of the output shaft of the actuator motor 72, the translational motion may occur on the arc-shaped shift fork 712. The arc-shaped groove 714 cooperating with the arc-shaped shift fork 712 may be provided on the outer surface of the first ring 711 along a circumferential direction, so that the arc-shaped shift fork 712 may be mounted in the arc-shaped groove 714 of the first ring 711. Further, in the rotation process of the actuator motor 72, the arc-shaped shift fork 712 can slide axially with the first ring 711. The first ring 711 is mounted to the driven plate 62. Further, the first ring 711 can slide axially with the driven plate 62.

In one embodiment, the first ring 711 may be mounted to the driven plate 62 in a plurality of manners. For example, one manner may be as shown in FIG. 4 with reference to FIG. 2 and FIG. 3. FIG. 4 is a schematic diagram of partial enlargement of a dashed-line box A in FIG. 3. The first ring 711 is sleeved on the driven plate 62. To enable the first ring 711 to drive the driven plate 62 to slide axially, a first annular protrusion 621*c* may be correspondingly disposed on an inner surface of the driven plate 62 along a circumferential direction, an annular groove 711*c* may be disposed on the outer surface of the first ring 711 along a circumferential direction, the first ring 711 is sleeved on the driven plate 62, and the first annular protrusion 621*c* of the driven plate 62 is located in the annular groove 711*c* of the first ring 711. In this way, when the first ring 711 slides axially, the driven plate 62 may be driven to slide axially.

The structure in which the first ring 711 can drive the driven plate 62 to slide is implemented through cooperation between the protrusion and the groove in the foregoing, or may be implemented through pushing or pulling by two protrusions in the following. For details, refer to the following description of a structure with an elastic member.

Figure 5:
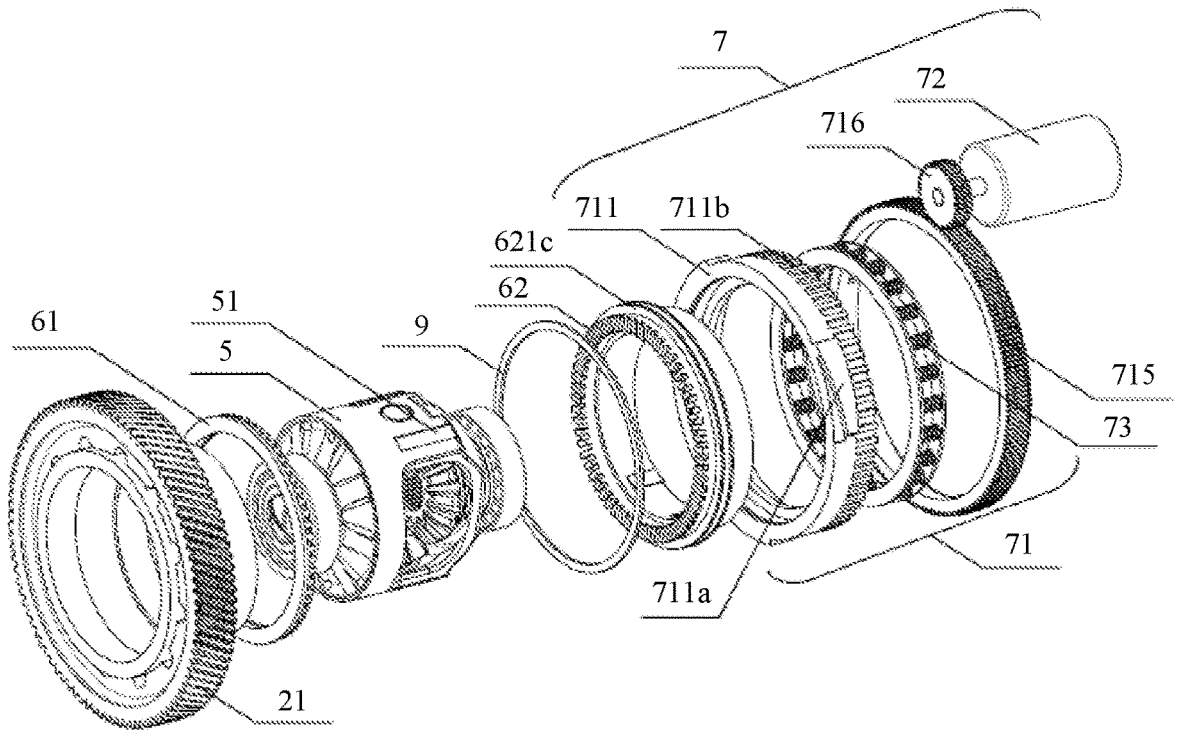
FIG. 5 is a schematic diagram of a split structure of a bevel type powertrain according to an embodiment of this application.

Another possible structure of the annular sliding member 71 may be shown in FIG. 5. The annular sliding member 71 may include a first ring 711, a second ring 715, and a third ring 716. Structures of the first ring 711, the second ring 715, and the third ring 716 may be set as follows.

A first beveled protrusion 711*a* and a circumferential limiting structure 711*b* are disposed on an outer surface of the first ring 711 along a circumferential direction. A second beveled protrusion 715*a* is disposed on an inner surface of the second ring 715 along a circumferential direction, and the first beveled protrusion 711*a* of the first ring 711 adapts to the second beveled protrusion 715*a* of the second ring 715. As shown in FIG. 5, an axial rack is disposed on the outer surface of the second ring 715, and an axial rack is disposed on an outer surface of the third ring 716.

A mounting relationship among the first ring 711, the second ring 715, and the third ring 716 may be as follows.

Figure 6:
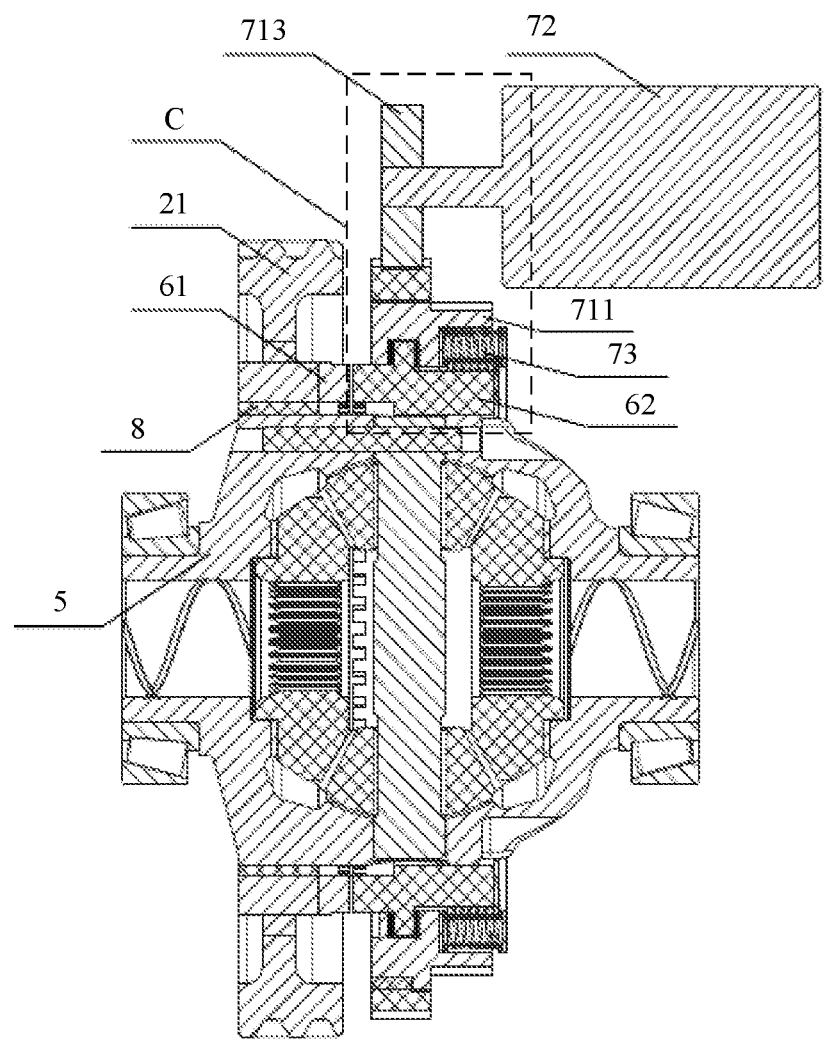
FIG. 6 is a schematic diagram of a structure of the powertrain in FIG. 5 after being mounted.
Figure 7:
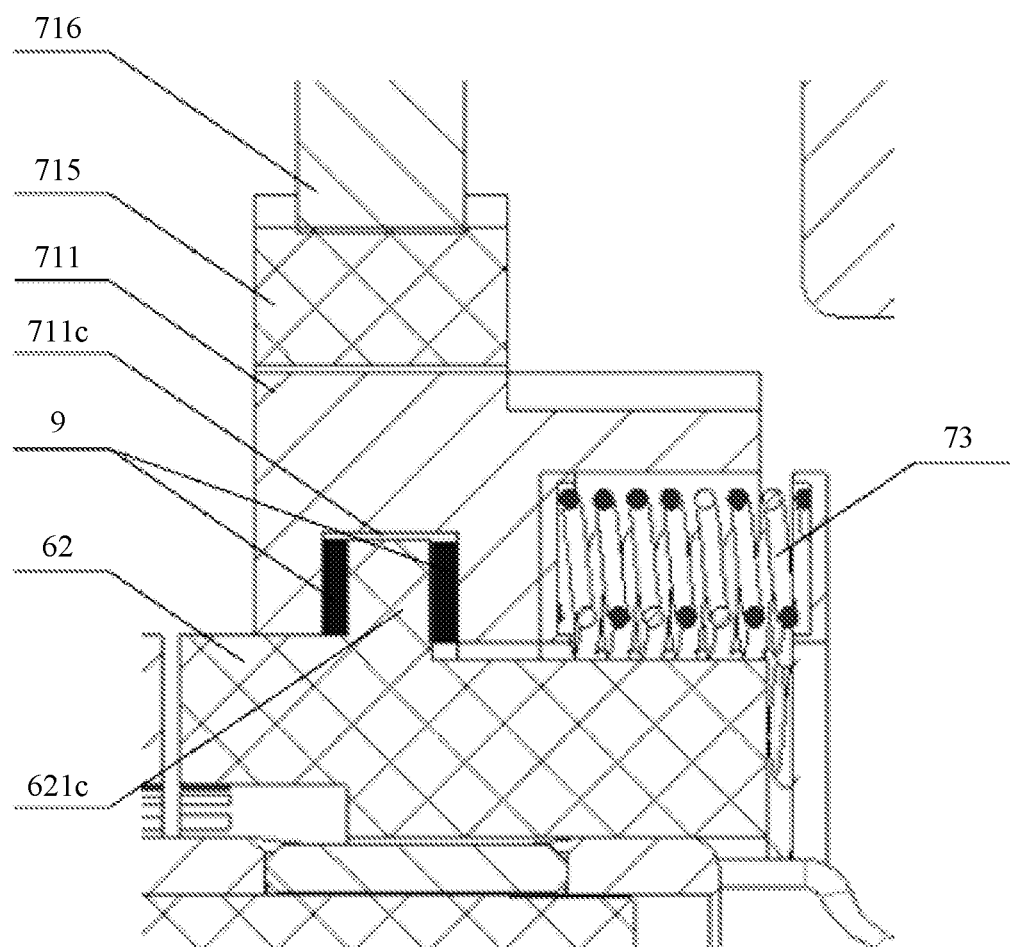
FIG. 7 is a schematic diagram of a partial structure shown in a dashed-line box C in FIG. 6.

As shown in FIG. 6 and FIG. 7 with reference to FIG. 5, FIG. 7 is a schematic diagram of partial enlargement of a dashed-line box C in FIG. 6. The first ring 711 is sleeved on the outer surface of the driven plate 62, and a plane bearing 9 is mounted between the first ring 711 and the driven plate 62. The second ring 715 is sleeved on the outer surface of the first ring 711, the axial rack of the second ring 715 is engaged with the axial rack of the third ring 716, and the third ring 716 is mounted on the output shaft of the actuator motor 72.

An effect achieved by the foregoing structure setting and mounting relationship is that the first ring 711 rotates in the circumferential direction in a limited state and slides in the axial direction in a free state through the circumferential limiting structure 711*b* and cooperation between the first beveled protrusion 711*a* of the first ring 711 and the second beveled protrusion 715*a* of the second ring 715.

In one embodiment, as shown in FIG. 5, the first ring 711 is an annular structure having a specific width, and may be divided into two parts along a width direction. The first beveled protrusion 711*a* is disposed on an outer surface of one part along a circumferential direction, and the circumferential limiting structure 711*b* is disposed on an outer surface of the other part along a circumferential direction. The first beveled protrusion 711*a* is configured to drive the first ring 711 to slide axially, and the circumferential limiting structure 711*b* is configured to limit rotation of the first ring 711, but does not limit axially sliding of the first ring 711. The circumferential limiting structure 711*b* may be in one embodiment a strip-shaped protrusion structure, and may cooperate with a strip-shaped groove that matches the circumferential limiting structure 711*b*, to limit a circumferential rotational motion of the first ring 711. The strip-shaped groove matching the strip-shaped protrusion structure may be provided on a fastening part that is in contact with the first ring 711. For example, if the first ring 711 is adjacent to a reducer, the strip-shaped groove may be provided on a housing of the reducer.

In one embodiment, the first ring 711 is sleeved on the outer surface of the driven plate 62, the driven plate 62 needs to perform a rotational motion, and the rotational motion of the first ring 711 is limited by the circumferential limiting structure 711*b*. Correspondingly, the plane bearing 9 may be mounted between the first ring 711 and the driven plate 62.

The plane bearing 9 is a unidirectional rotating bearing in which one bearing ring can rotate and the other bearing ring cannot rotate.

As described above, the first ring 711 and the driven plate 62 may be mounted through cooperation between the first annular protrusion and the annular groove. Correspondingly, as shown in FIG. 6 and FIG. 7, the first annular protrusion 621*c* is disposed on the outer surface of the driven plate 62 in the circumferential direction, and the annular groove 711*c* is provided on an inner surface of the first ring 711 in the circumferential direction. The first annular protrusion 621*c* is located in the annular groove 711*c*, and the plane bearing 9 is mounted between a side wall of the first annular protrusion 621*c* and a groove wall of the annular groove 711*c*.

In one embodiment, as shown in FIG. 7, one plane bearing 9 is mounted between one side wall of the first annular protrusion 621*c* of the driven plate 62 and one groove wall of the annular groove 711*c* of the first ring 711. One plane bearing 9 is mounted between the other side wall of the first annular protrusion 621*c* of the driven plate 62 and the other groove wall of the annular groove 711*c* of the first ring 711. In an example, the two plane bearings 9 are mounted between the driven plate 62 and the first ring 711, so that the driven plate 62 may rotate in the circumferential direction relative to the first ring 711. Further, the driven plate 62 may rotate in the circumferential direction, and the first ring 711 may also be limited in the circumferential direction, and cannot rotate in the circumferential direction.

Based on the foregoing description, a mounting relationship between the driven plate 62, the first ring 711, the second ring 715, and the third ring 716 may be as follows. As shown in FIG. 6 and FIG. 7 with reference to FIG. 5, the first ring 711 is sleeved on the driven plate 62, the first ring protrusion 621c of the driven plate 62 is located in the ring groove 711c of the first ring 711, and the plane bearing 9 for isolating a rotational motion is mounted between the side wall of the first annular protrusion 621c and the groove wall of the annular groove 711c. The second ring 715 is sleeved on the first ring 711. That is, the first ring 711 is located in the second ring 715, and the first beveled protrusion 711a of the first ring 711 cooperates with the second beveled protrusion 715a of the second ring 715. The second ring 715 and the third ring 716 are engaged with each other by using respective axial rack teeth, and the third ring 716 is mounted on the output shaft of the actuator motor 72.

Figure 8:
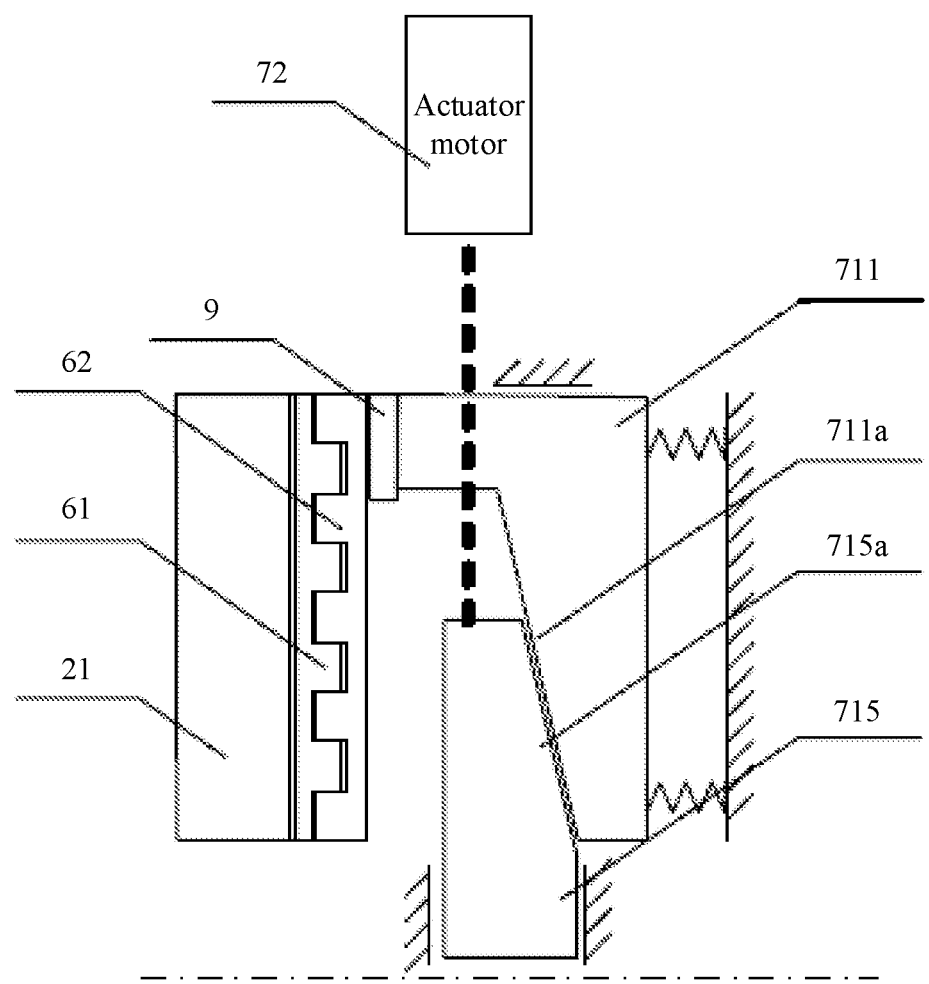
FIG. 8 is a schematic diagram of separation and combination conversion performed by a clutch of the powertrain in FIG. 5.
Figure 9:
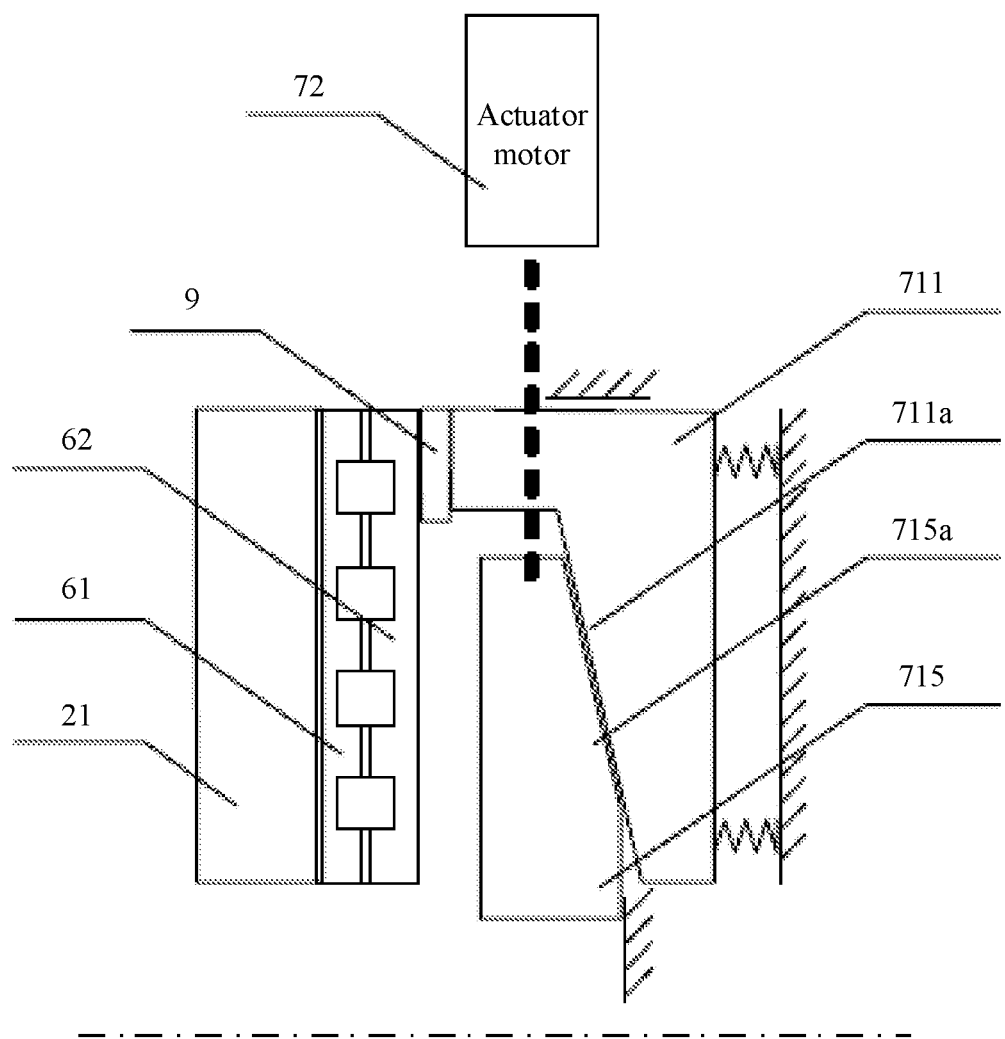
FIG. 9 is a schematic diagram of separation and combination conversion performed by a clutch of the powertrain in FIG. 5.

In this way, as shown in FIG. 8 and FIG. 9 with reference to FIG. 5 and FIG. 6, when the actuator motor 72 rotates in a first rotation direction, the third ring 716 rotates with rotation of the output shaft, to drive the second ring 715 to rotate. Because the first ring 711 is limited by the circumferential limiting structure 711b in the circumferential direction, the first ring 711 cannot perform a rotational motion. In this way, in a rotation process of the second ring 715, the second beveled protrusion 715a of the second ring 715 pushes the first beveled protrusion 711a of the first ring 711, so that the first ring 715 slides axially and slides to a direction in which the driving plate 61 is located. In an axially sliding process of the first ring 711, the first annular protrusion 621c on the driven plate 62 is located in the annular groove 711c of the first ring 711, so that the first ring 711 may push the driven plate 62 to a location of the driving plate 61, to combine the driving plate 61 with the driven plate 62.

Similarly, when the actuator motor 72 rotates in a second rotation direction, the third ring 716 rotates with rotation of the output shaft, to drive the second ring 715 to rotate. Because the first ring 711 is limited by the circumferential limiting structure 711b in the circumferential direction, the first ring 711 cannot perform a rotational motion. In this way, in the rotation process of the second ring 715, the second beveled protrusion 715a of the second ring 715 pushes the first beveled protrusion 711a of the first ring 711, so that the first ring 715 slides axially and slides away from the direction in which the driving plate 61 is located. In the axially sliding process of the first ring 711, the first annular protrusion 621c on the driven plate 62 is located in the annular groove 711c of the first ring 711, so that the first ring 711 may push the driven plate 62 away from the location of the driving plate 61, to separate the driving plate 61 from the driven plate 62.

In a possible application scenario, it is relatively safe whether the clutch 6 is in the jointed state and the separated state. However, if the clutch 6 is in a state between the jointed state and the separated state, driving of the automobile is dangerous. Correspondingly, to improve security of the powertrain, the elastic member may be configured to control the clutch 6 to maintain in the jointed state or the separated state. A corresponding implementation structure may be as follows.

As shown in FIG. 2, the clutch control component 7 further includes an elastic member 73, where a first end of the elastic member 73 abuts against the driven plate 62, and a second end of the elastic member 73 abuts against the housing of the differential 5. The elastic member 73 is configured to control the driving plate 61 and the driven plate 62 to maintain in the jointed state or the separated state. In this way, even if the actuator motor 72 is faulty and cannot work, under an elastic force of the elastic member 73, the driven plate 62 can still enable the clutch 6 to be in the jointed state or in the separated state, so that the clutch 6 is not in an intermediate state between the jointed state and the separated state. In this way, security of the powertrain can be improved.

As shown in FIG. 2, the elastic member 73 may be a spring, and the elastic member 73 may be in a compressed state or may be in a stretched state. In this embodiment, a case in which the elastic component 73 is in the compressed state may be used as an example.

In one embodiment, the elastic member 73 has different functions due to different mounting manners. If the elastic force of the elastic member 73 faces the direction in which the driving plate 61 is located, the elastic member 73 may push the driven plate 62 close to the driving plate 61, to maintain the driving plate 61 and the driven plate 62 in the jointed state. If a direction of the elastic force of the elastic member 73 is opposite to the direction in which the driving plate 61 is located, the elastic member 73 may push the driven plate 62 away from the driving plate 61, to maintain the driving plate 61 and the driven plate 62 in the separated state. For ease of description, a powertrain in which the elastic member 73 controls the driving plate 61 and the driven plate 62 to maintain in the jointed state may be referred to as a normally closed powertrain, and a powertrain in which the elastic member 73 controls the driving plate 61 and the driven plate 62 to maintain in the separated state is referred to as a normally open powertrain.

Figure 3:
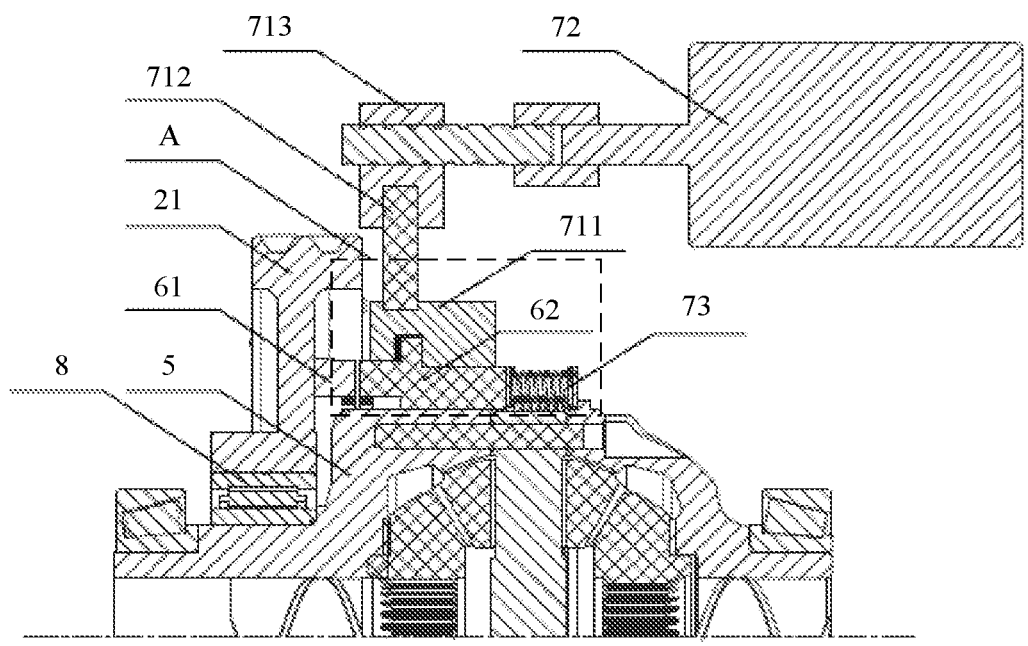
FIG. 3 is a schematic diagram of a structure of the powertrain in FIG. 2 after being mounted.
Figure 4:
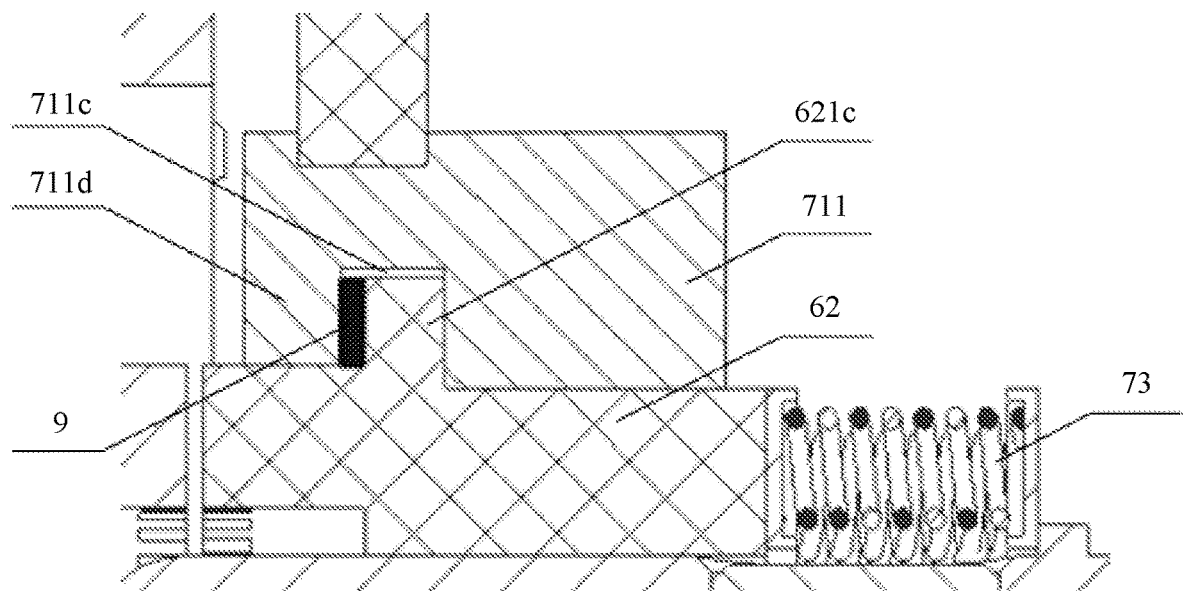
FIG. 4 is a schematic diagram of a partial structure shown in a dashed-line box A in FIG. 3.

For the normally closed powertrain, a mounting manner of the elastic member 73 may be shown in FIG. 2 to FIG. 4. The first end of the elastic member 73 that is close to the driving plate 61 may abut against the driven plate 62, and the second end of the elastic member 73 that is away from the driving plate 61 may be fixed on the housing of the differential 5, for example, may be fixed on the housing of the differential 5 by using a snap ring or the like. Alternatively, a snap ring may be mounted on the inner surface of the driven plate 62. A part of the snap ring is mounted on the inner surface of the driven plate 62, and the other part protrudes from the inner surface of the driven plate 62, so that the elastic member 73 may abut against the snap ring. In this way, the first end of the elastic member 73 may abut against the driven plate 62 by using the snap ring.

Regardless of a mounting manner of the elastic member 73, the direction of the elastic force of the elastic member 73 of the normally closed powertrain faces the direction in which the driving plate 61 is located. Therefore, when the actuator motor 72 is in a closed state, the elastic member 73 may eject the driven plate 62 to the driving plate 61, so that the clutch 6 is in the jointed state.

For the normally closed powertrain, in addition to cooperation between the first annular protrusion 621c and the annular groove 711c, the structure in which the first ring 711 can drive the driven plate 62 to slide may alternatively be implemented by using two annular protrusions. In one embodiment, as shown in FIG. 4, a second annular protrusion 711d protruding inside is disposed at an end part of the first ring 711, the first annular protrusion 621c is still disposed on the outer surface of the driven plate 62, and the first ring 711 is sleeved on the driven plate 62. In an example, the driven plate 62 is located in the first ring 711, and an inner end surface of the second annular protrusion 711*d* of the first ring 711 is in contact with an end surface that is of the first annular protrusion 621*c* of the driven plate 62 and close to the driving plate 61. In this way, when the first ring 711 slides in the direction away from the driving plate 61, the first ring 711 may pull the driven plate 62 to axially slide.

In this case, to prevent the clutch control component 7 from rotating in the circumferential direction with the driven plate 62, correspondingly, as shown in FIG. 2 to FIG. 4, the plane bearing may be mounted between the first ring 711 and the driven plate 62. In one embodiment, as shown in FIG. 4, the plane bearing 9 is mounted between the inner end surface of the second annular protrusion 711*d* of the first ring 711 and the end surface that is of the first annular protrusion 621*c* of the driven plate 62 and close to the driving plate 61. The plane bearing 9 may be used to isolate a rotating motion between the driven plate 62 and the first ring 711. When the driven plate 62 rotates in the circumferential direction, the first ring 711 does not rotate with the driven plate 62.

The elastic member 73 enables the clutch 6 to maintain in the jointed state. Correspondingly, to enable the clutch 6 to maintain in the separated state, the actuator motor 72 may be in a running state. In this case, a force output by the actuator motor 72 to the outside is used to balance the elastic force of the elastic member 73, to maintain the driven plate 62 and the driving plate 61 in the separated state, so as to maintain the clutch 6 in the separated state. In this state, the output shaft of the actuator motor 72 may not rotate. When the clutch 6 is in the jointed state, the driven plate 62 may be in contact with the driving plate 61 through the elastic force of the elastic member 73, to maintain the clutch 6 in the jointed state.

In this way, the elastic member 73 may apply a force towards the driving plate 61 to the driven plate 62, and the first ring 711 may apply a force that is opposite to the driving plate 61 to the driven plate 62 under an action of the actuator motor 72. Further, the driven plate 62 may slide axially towards the driving plate 61, and may alternatively slide axially backward towards the driving plate 61.

In this structure, combination and separation of the clutch 6 of the normally closed powertrain may be implemented as follows.

Figure 10:
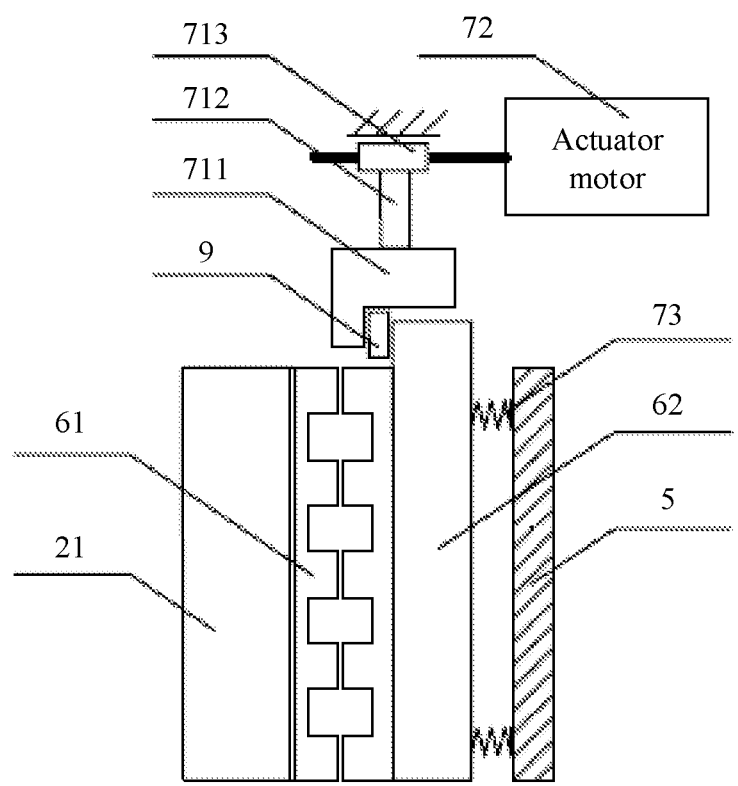
FIG. 10 is a schematic diagram of separation and combination conversion performed by a clutch of the powertrain in FIG. 2.
Figure 11:
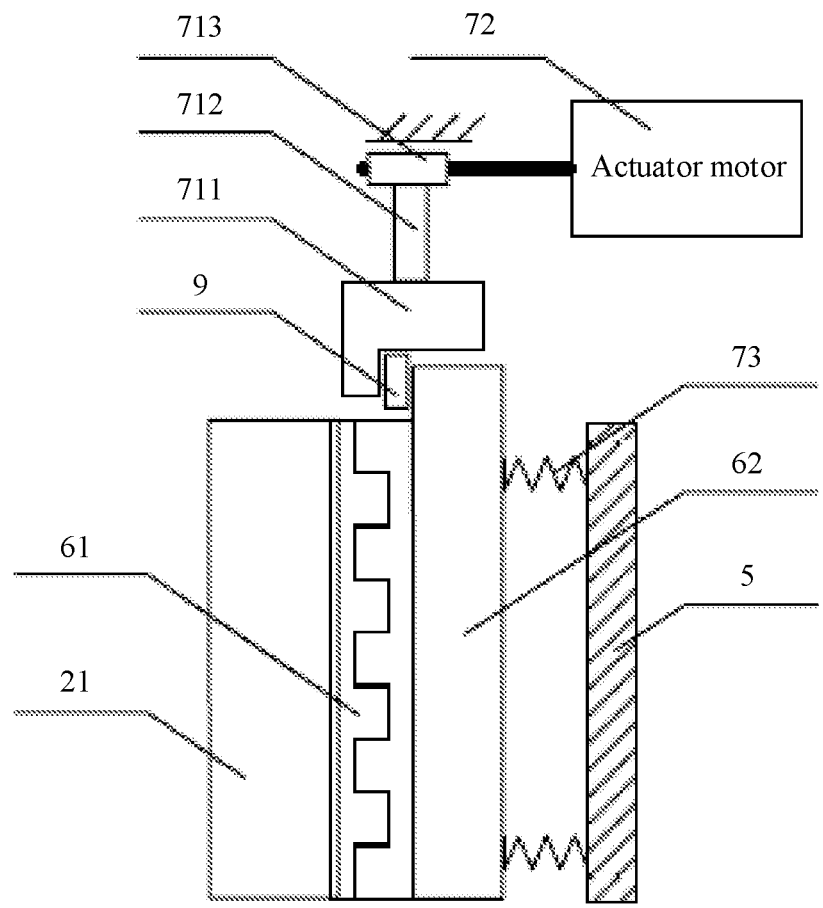
FIG. 11 is a schematic diagram of separation and combination conversion performed by a clutch of the powertrain in FIG. 2.

Refer to FIG. 10 and FIG. 11. FIG. 10 is a schematic diagram in which the clutch of the normally closed powertrain is in the separated state, and FIG. 11 is a schematic diagram in which the clutch of the powertrain is in the jointed state.

First, a process of switching the clutch 6 from the separated state to the jointed state may be as follows. The actuator motor 72 rotates in the first rotation direction, and the elastic force of the elastic member 73 towards the driving plate 61 may push the driven plate 62 to slide axially in a direction towards the driving plate 61. When the driven plate 62 slides to be combined with the driving plate 61, the actuator motor 72 may stop running, and the elastic member 73 maintains the clutch 6 in the jointed state. That is, in the state shown in FIG. 11, the actuator motor 72 may stop running, and the driving plate 61 and the driven plate 62 are maintained in the jointed state through the elastic force of the elastic member 73.

Second, a process of switching the clutch 6 from the jointed state to the separated state may be as follows. The actuator motor 72 rotates in the second rotation direction. As shown in FIG. 4, the first ring 711 can pull the driven plate 62 to slide axially in the direction away from the driving plate 61 through cooperation between the annular groove 711*c* of the first ring 711 and the first annular protrusion 621*c* of the driven plate 62 or cooperation between the second annular protrusion 711*d* of the first ring 711 and the first annular protrusion 621*c* of the driven plate 62. When the driven plate 62 slides to be separated from the driving plate 61, the elastic member 73 is in the compressed state. To overcome the elastic force of the elastic member 73, correspondingly, the actuator motor 72 needs to be always in the running state. In this running state, the output shaft of the actuator motor 72 does not rotate, and the actuator motor 72 may provide a force to overcome the elastic force of the elastic member 73.

The foregoing describes the mounting manner of the elastic member 73 in the normally closed powertrain. The following describes a mounting manner of the elastic member 73 in the normally open powertrain. The first end of the elastic member 73 close to the driving plate 61 may abut against the housing of the differential 5, and the second end of the elastic member 73 away from the driving plate 61 may abut against the driven plate 62. In one embodiment, a mounting groove may be provided on the inner surface of the driven plate 62, and the elastic member 73 may be located in the mounting groove. The first end of the elastic member 73 abuts against the housing of the differential by using a snap ring, and the second end of the elastic member 73 abuts against the driven plate 62 by using a snap ring. The direction of the elastic force of the elastic member 73 is opposite to the direction in which the driving plate 61 is located. Therefore, when the actuator motor 72 is in the closed state, the elastic member 73 may eject the driven plate 62 from the driving plate 61, to maintain the clutch 6 in the separated state.

Figure 12:
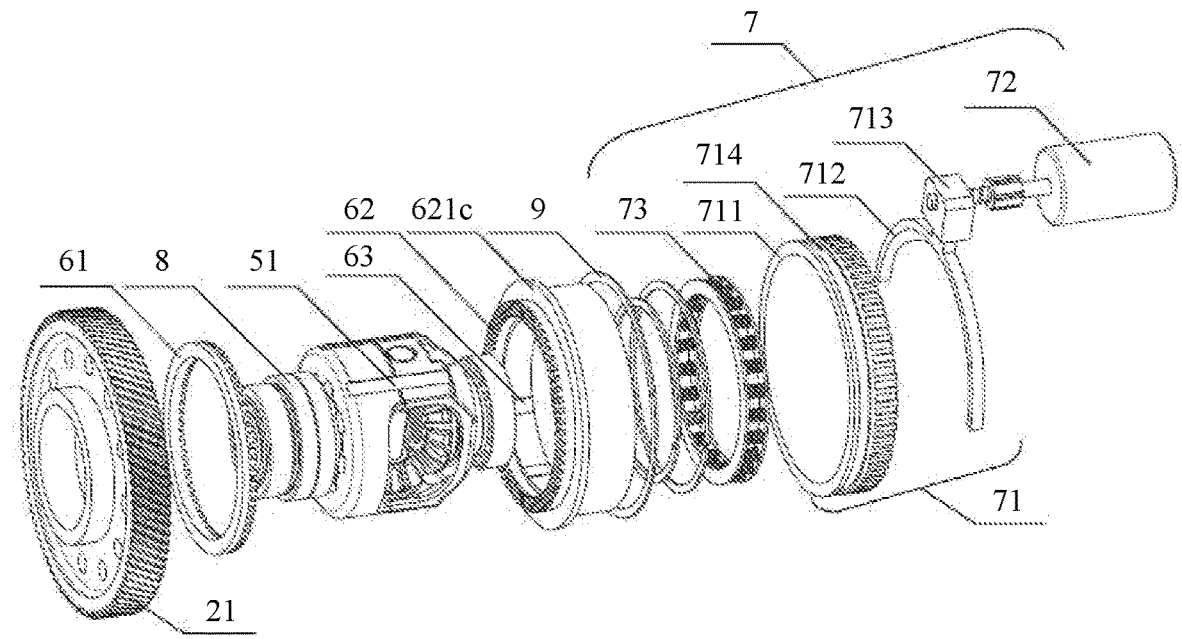
FIG. 12 is a schematic diagram of a split structure of a normally open powertrain according to an embodiment of this application.
Figure 13:
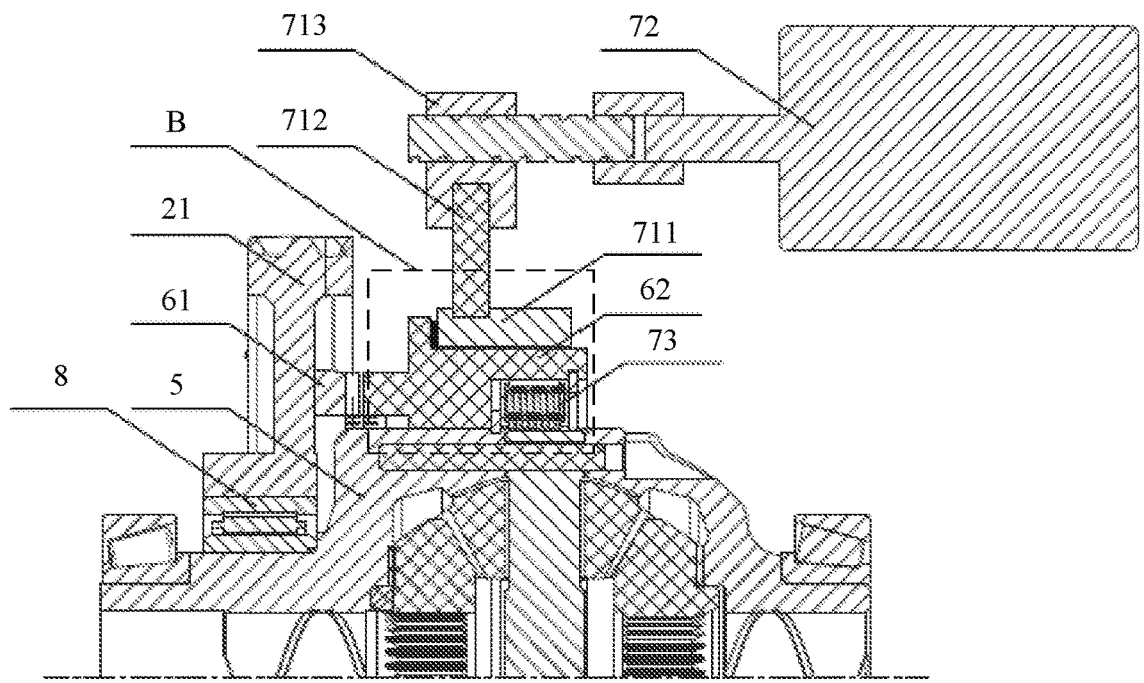
FIG. 13 is a schematic diagram of a structure of the powertrain in FIG. 12 after being mounted.
Figure 14:
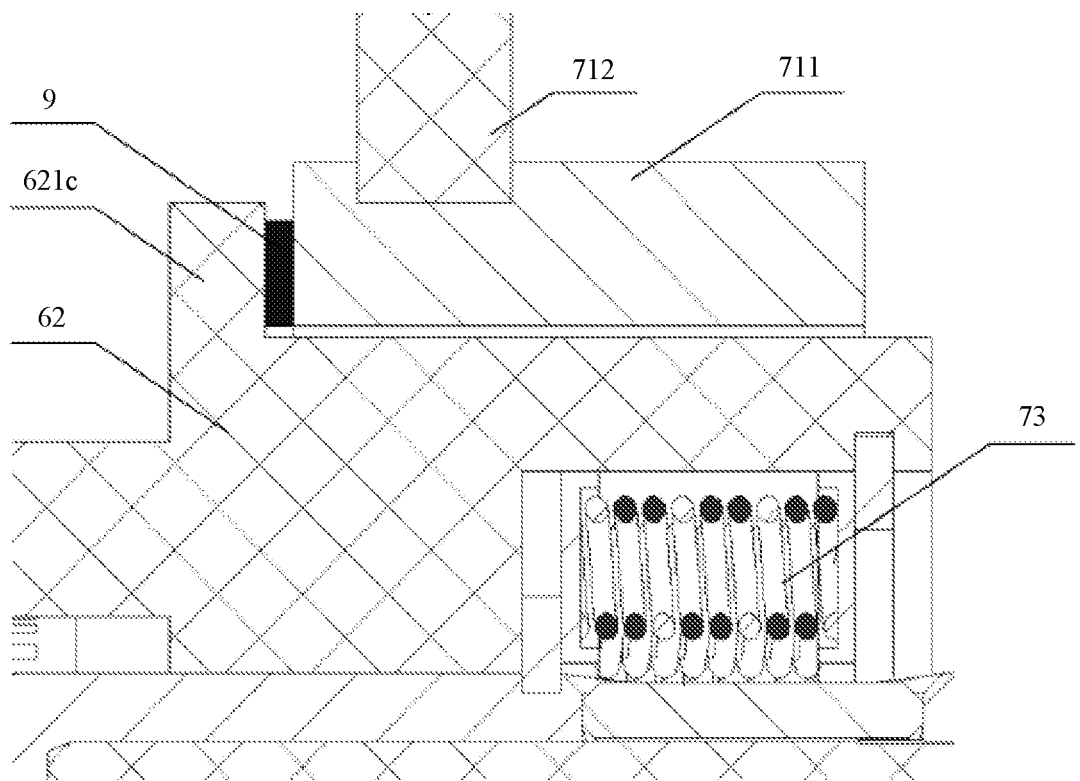
FIG. 14 is a schematic diagram of a partial structure shown in a dashed-line box B in FIG. 13.

For the normally open powertrain, refer to FIG. 12 to FIG. 14. FIG. 14 is a schematic diagram of a partial structure in a dashed-line box B in FIG. 13. In addition to cooperation between the first annular protrusion 621*c* and the annular groove 711*c*, the structure in which the first ring 711 can drive the driven plate 62 to slide may alternatively be implemented by using the first annular protrusion 621*c*. In one embodiment, as shown in FIG. 13 and FIG. 14, the first annular protrusion 621*c* is still disposed on the outer surface of the driven plate 62. An outer diameter of the annular protrusion 621 is greater than an inner diameter of the first ring 711. The first ring 711 is sleeved on the driven plate 62, and an end surface of the first ring 711 may abut against the first annular protrusion 621*c* of the driven plate 62.

In this case, to prevent the clutch control component 7 from rotating in the circumferential direction with the driven plate 62, the plane bearing may be correspondingly mounted between the first ring 711 and the driven plate 62. In one embodiment, as shown in FIG. 14, the plane bearing 9 may be mounted between the first annular protrusion 621*c* of the driven plate 62 and an end surface that is of the first ring 711 and close to the driving plate 61. The plane bearing 9 may be used to isolate a rotating motion between the driven plate 62 and the first ring 711. When the driven plate 62 rotates in the circumferential direction, the first ring 711 does not rotate with the driven plate 62.

The elastic member 73 enables the clutch 6 to maintain in the separated state. Correspondingly, to enable the clutch 6 to maintain in the jointed state, the actuator motor 72 may be in a running state. In this case, a force output by the actuator motor 72 to the outside is used to balance the elastic force of the elastic member 73, to maintain the driven plate 62 and the driving plate 61 in the jointed state, so as to maintain the clutch 6 in the jointed state. In this state, the output shaft of the actuator motor 72 may not rotate. When the clutch 6 is in the separated state, the driven plate 62 may be separated from the driving plate 61 through the elastic force of the elastic member 73, to maintain the clutch 6 in the separated state.

In this way, the elastic member 73 may apply a force that is opposite to the driving plate 61 to the driven plate 62, and the first ring 711 may apply a force towards the driving plate 61 to the driven plate 62 under an action of the actuator motor 72. Further, the driven plate 62 may slide axially towards the driving plate 61, and may alternatively slide axially backward towards the driving plate 61.

In this structure, combination and separation of the clutch 6 of the normally open powertrain may be implemented as follows.

Figure 15:
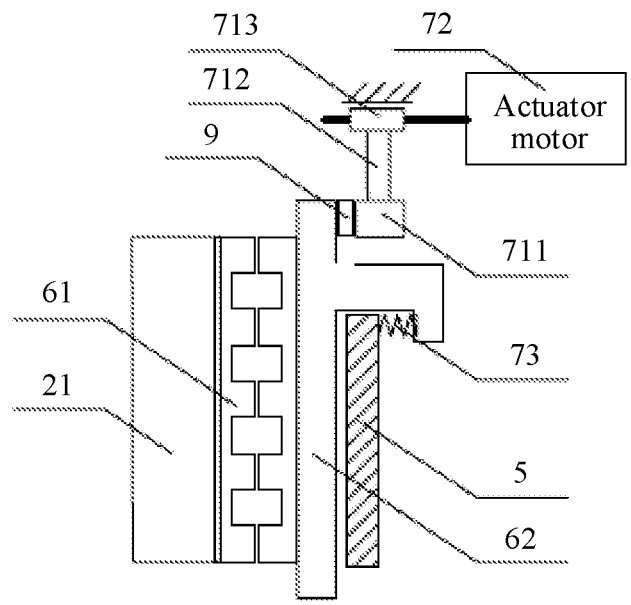
FIG. 15 is a schematic diagram of separation and combination conversion performed by a clutch of the powertrain in FIG. 12.

Refer to FIG. 15. FIG. 15 is a schematic diagram of the normally open powertrain in which the clutch is in the separated state.

First, the process of switching the clutch 6 from the separated state to the jointed state may be as follows. The actuator motor 72 rotates in the first rotation direction, and the first ring 711 can push the driven plate 62 to slide axially in the direction close to the driving plate 61 through cooperation between the end surface of the first ring 711 and the first ring protrusion 621c of the driven plate 62. When the driven plate 62 slides to be combined with the driving plate 61, the elastic member 73 is in the compressed state. To overcome the elastic force of the elastic member 73, correspondingly, the actuator motor 72 needs to be always in the running state. In this running state, the output shaft of the actuator motor 72 does not rotate, and the actuator motor 72 may provide a force to overcome the elastic force of the elastic member 73, so as to maintain the clutch 6 in the jointed state.

Second, the process of switching the clutch 6 from the jointed state to the separated state may be as follows. The elastic force of the elastic member 73 opposite to the driving plate 61 may push the driven plate 62 to slide axially in the direction away from the driving plate 61. When the driven plate 62 slides to be separated from the driving plate 61, the actuator motor 72 may stop running, and the elastic member 73 maintains the clutch 6 in the separated state.

One end of the elastic component 73 described above abuts against the driven plate 62, and the other end abuts against the housing of the differential 5. Alternatively, one end of the elastic component 73 may abut against the first ring 711, and the other end may abut against the housing of the differential 5. A mounting manner of the elastic member 73 and whether the elastic member 73 is in the compressed state or the stretched state are not in one embodiment limited in this embodiment, and provided that the elastic member 73 can maintain the driven plate 62 and the driving plate 61 in the jointed state, or the elastic member 73 can maintain the driven plate 62 and the driving plate 61 in the separated state.

The following summarizes several possible structure mounting relationships of the powertrain. For ease of description, a location of the large gear 21 of the powertrain may be considered as a left side, and a location of the actuator motor 72 may be considered as a right side.

For a possible structure relationship of the powertrain, for example, for a structure of a normally closed powertrain, refer to FIG. 1 to FIG. 4. For switching between the jointed state and the separated state of the clutch 6 of the normally closed powertrain, refer to FIG. 10 and FIG. 11. The driving plate 61 of the clutch 6 may be fixed on the large gear 21 of the gear mechanism 2, and the large gear 21 may be fixed on the stepped shaft on the left side of the differential 5 through the bearing 8, where the driving plate 61 is sleeved on the housing of the differential 5. As shown in FIG. 4, the first ring 711 is sleeved on the driven plate 62, and the first ring protrusion 621c of the driven plate 62 is located in the second ring protrusion 711d of the first ring 711. That is, the second annular protrusion 711d of the first ring 711 is located on the left side of the first annular protrusion 621c of the driven plate 62. The driven plate 62 sleeved with the first ring 711 is sleeved on the housing of the differential 5, and the axial protrusion 63 of the driven plate 62 is located in the axial chute 51 on the housing of the differential 5. The driven plate 62 may slide axially relative to the differential 5. To isolate circumferential rotation between the driven plate 62 and the first ring 711, correspondingly, as shown in FIG. 4, the plane bearing 9 is mounted between the first annular protrusion 621c of the driven plate 62 and the second annular protrusion 711d of the first ring 711. The first end of the elastic member 73 close to the driving plate 61 abuts against the end surface of the driven plate 62, and the second end of the elastic member 73 away from the driving plate 61 abuts against the housing of the differential 5. In addition, the elastic member 73 may be in the compressed state, and the direction of the elastic force of the elastic member 73 faces the direction in which the driving plate 61 is located. The arc-shaped shift fork 712 is mounted in the arc-shaped groove 714 of the first ring 711, the arc-shaped shift fork 712 is fastened to the sliding block 713, and the sliding block 713 is mounted on the output shaft of the actuator motor 72 through thread rotation.

In this way, for the process of switching the clutch 6 from the separated state to the jointed state, refer to FIG. 10 and FIG. 11. The actuator motor 72 rotates in the first rotation direction, the arc-shaped shift fork 712 drives the first ring 711 to slide axially in the direction close to the driving plate 61, and the driven plate 62 slides to the location of the driving plate 61 under the elastic force of the elastic member 73. When the driven plate 62 slides to be combined with the driving plate 61, the actuator motor 72 may stop running, and the driven plate 62 and the driving plate 61 maintain in the jointed state under the elastic force of the elastic member 73. In this case, the clutch 6 is in the jointed state, and the powertrain is in a driving state.

The process of switching the clutch 6 from the jointed state to the separated state may be as follows. The actuator motor 72 rotates in the second rotation direction, and the arc-shaped shift fork 712 drives the first ring 711 to slide axially in the direction away from the driving plate 61. The second annular protrusion 711d of the first ring 711 may pull the first annular protrusion 621c of the driven plate 62, so that the driven plate 62 may slide axially in the direction away from the driving plate 61. When the driven plate 62 slides to be separated from the driving plate 61, the actuator motor 72 continues to maintain the running state, to overcome the elastic force of the elastic member 73, so as to maintain the driven plate 62 and the driving plate 61 in the separated state. In this case, the clutch 6 is in the separated state, and the powertrain is in a non-driving state.

It can be learned that, when the powertrain is in the driving state, the clutch 6 is in the jointed state, and the drive motor 1 is used as the power source to drive the automobile to run. When the powertrain is in the non-driving state, for example, when the automobile is in the coasting phase, the clutch is in the separated state, and the drive motor 1 does not rotate with the left half shaft 3 and the right half shaft 4. Further, the drive motor 1 does not obstruct driving of the automobile as resistance. Therefore, the powertrain disposed with the structure can improve the driving effect of the automobile.

In addition, the elastic member 73 in the powertrain may enable the driven plate 62 to be combined with the driving plate 61, so that even if the actuator motor 72 is faulty and cannot work normally, the driven plate 62 and the driving plate 61 can maintain the jointed state under the elastic force of the elastic member 73. This can avoid an accident caused when the clutch 6 is in the intermediate state between the jointed state and the separated state, to ensure safe driving of the automobile.

For another possible structure relationship of the powertrain, for example, a normally open powertrain, a mounting manner between the large gear 21 of the gear mechanism 2, the differential 5, and the driving plate 61 of the clutch 6 is similar to that of the foregoing description. For details, refer to the related descriptions.

For a structure of the normally open powertrain, refer to FIG. 12 to FIG. 14. The first ring 711 is sleeved on the driven plate 62, and the first ring protrusion 621c of the driven plate 62 is in contact with a left end surface of the first ring 711. That is, the first annular protrusion 621c of the driven plate 62 protrudes from the first ring 711. The driven plate 62 sleeved with the first ring 711 is sleeved on the housing of the differential 5, and the axial protrusion 63 of the driven plate 62 is located in the axial chute 51 on the housing of the differential 5. The driven plate 62 may slide axially relative to the differential 5. To isolate circumferential rotation between the driven plate 62 and the first ring 711, correspondingly, as shown in FIG. 14, the plane bearing 9 is mounted between the first annular protrusion 621c of the driven plate 62 and the left end surface of the first ring 711. The first end of the elastic member 73 close to the driving plate 61 abuts against the housing of the differential 5 by using a snap ring, and the second end of the elastic member 73 away from the driving plate 61 abuts against the inner wall of the driven plate 62 by using a snap ring. In addition, the elastic member 73 is in the compressed state, and the direction of the elastic force of the elastic member 73 is opposite to the direction in which the driving plate 61 is located. The arc-shaped shift fork 712 is mounted in the arc-shaped groove 714 of the first ring 711, the arc-shaped shift fork 712 is fastened to the sliding block 713, and the sliding block 713 is mounted on the output shaft of the actuator motor 72 through thread rotation.

In this way, for the process of switching the clutch 6 from the separated state to the jointed state, refer to FIG. 15. The actuator motor 72 rotates in the first rotation direction, the arc-shaped shift fork 712 drives the first ring 711 to slide axially in the direction close to the driving plate 61, and the left end surface of the first ring 711 may push the first ring protrusion 621c of the driven plate 62 to slide axially towards the location of the driving plate 61. When the driven plate 62 slides to be combined with the driving plate 61, the actuator motor 72 continues to maintain the running state, to overcome the elastic force of the elastic member 73, so as to maintain the driven plate 62 and the driving plate 61 in the jointed state. In this case, the clutch 6 is in the jointed state, and the powertrain is in a driving state.

For the process of switching the clutch 6 from the jointed state to the separated state, refer to FIG. 15. The actuator motor 72 rotates in the second rotation direction, the arc-shaped shift fork 712 drives the first ring 711 to slide axially in the direction away from the driving plate 61, and the driven plate 62 also slides away from the location of the driving plate 61 under the elastic force of the elastic member 73. When the driven plate 62 slides to be separated from the driving plate 61, the actuator motor 72 may stop running, and the driven plate 62 and the driving plate 61 maintain in the separated state under the elastic force of the elastic member 73. In this case, the clutch 6 is in the separated state, and the powertrain is in a non-driving state.

It can be learned that, when the powertrain is in the driving state, the clutch 6 is in the jointed state, and the drive motor 1 is used as the power source to drive the automobile to run. When the powertrain is in the non-driving state, for example, when the automobile is in the coasting phase, the clutch is in the separated state, and the drive motor 1 does not rotate with the left half shaft 3 and the right half shaft 4. Further, the drive motor 1 does not obstruct driving of the automobile as resistance. Therefore, the powertrain disposed with the structure can improve the driving effect of the automobile.

In addition, the elastic member 73 in the powertrain may enable the driven plate 62 to be separated from the driving plate 61, so that even if the actuator motor 72 is faulty and cannot work normally, the driven plate 62 and the driving plate 61 can maintain in the separated state under the elastic force of the elastic member 73. This can avoid an accident caused when the clutch 6 is in the intermediate state between the jointed state and the separated state, to ensure safe driving of the automobile.

For another possible structure relationship of the powertrain, for example, a bevel type powertrain, a mounting manner between the large gear 21 of the gear mechanism 2, the differential 5, and the driving plate 61 of the clutch 6 is similar to that of the foregoing description. For details, refer to the related descriptions.

For a structure of the bevel type powertrain, refer to FIG. 5 to FIG. 7. The first ring 711 is sleeved on the driven plate 62, and the first annular protrusion 621c of the driven plate 62 is located in the annular groove 711c of the first ring 711. The driven plate 62 sleeved with the first ring 711 is sleeved on the housing of the differential 5, and the axial protrusion 63 of the driven plate 62 is located in the axial chute 51 on the housing of the differential 5. The driven plate 62 may slide axially relative to the differential 5. To isolate the circumferential rotation between the driven plate 62 and the first ring 711, correspondingly, as shown in FIG. 7, the plane bearing 9 is mounted between the first annular protrusion 621c of the driven plate 62 and the annular groove 711c of the first ring 711. In an example, as shown in FIG. 7, one plane bearing 9 is mounted between one side wall of the first annular protrusion 621c and one groove wall of the annular groove 711c, and one plane bearing 9 is mounted between the other side wall of the first annular protrusion 621c and the other groove wall of the annular groove 711c. In addition, the circumferential limiting structure 711b is further disposed on the outer surface of the first ring 711, to limit the first ring 711 to rotate in the circumferential direction.

The first end of the elastic member 73 close to the driving plate 61 abuts against an inner wall of the first ring 711, and the second end of the elastic member 73 away from the driving plate 61 abuts against the housing of the differential 5. In addition, the elastic member 73 may be in the compressed state, and the direction of the elastic force of the elastic member 73 faces the direction in which the driving plate 61 is located. The second ring 715 is sleeved on the outer surface of the first ring 711, and the first beveled protrusion 711a of the first ring 711 adapts to the second beveled protrusion 715a of the second ring 715. The third ring 716 is engaged with the second ring 715 by using the axial rack, and the third ring 716 is mounted on the output shaft of the actuator motor 72.

In this way, for the process of switching the clutch 6 from the separated state to the jointed state, refer to FIG. 8 and FIG. 9. The actuator motor 72 rotates in the first rotation direction, and when the second beveled protrusion 715a of the second ring 715 rotates, the first beveled protrusion 711a of the first ring 711 is pushed to slide in the direction close to the driving plate 61. Because the first annular protrusion 621c of the driven plate 62 is located in the annular groove 711c of the first ring 711, the first ring 711 may push the driven plate 62 to slide axially in the direction close to the driving plate 61. When the driven plate 62 slides to be combined with the driving plate 61, the actuator motor 72 may stop running, and the driven plate 62 and the driving plate 61 maintain in the jointed state under the elastic force of the elastic member 73. In this case, the clutch 6 is in the jointed state, and the powertrain is in the driving state.

The process of switching the clutch 6 from the jointed state to the separated state may be as follows. The actuator motor 72 rotates in the second rotation direction, and the second beveled protrusion 715a of the second ring 715 pushes the first beveled protrusion 711a of the first ring 711 to slide in the direction away from the driving plate 61. Because the first annular protrusion 621c of the driven plate 62 is located in the annular groove 711c of the first ring 711, the first ring 711 may pull the driven plate 62 to slide axially in the direction away from the driving plate 61. When the driven plate 62 slides to be separated from the driving plate 61, the actuator motor 72 continues to maintain the running state, to overcome the elastic force of the elastic member 73, so as to maintain the driven plate 62 and the driving plate 61 in the separated state. In this case, the clutch 6 is in the separated state, and the powertrain is in the non-driving state.

It can be learned that, when the powertrain is in the driving state, the clutch 6 is in the jointed state, and the drive motor 1 is used as the power source to drive the automobile to run. When the powertrain is in the non-driving state, for example, when the automobile is in the coasting phase, the clutch is in the separated state, and the drive motor 1 does not rotate with the left half shaft 3 and the right half shaft 4. Further, the drive motor 1 does not obstruct driving of the automobile as resistance. Therefore, the powertrain disposed with the structure can improve the driving effect of the automobile.

In addition, the elastic member 73 in the powertrain may enable the driven plate 62 to be combined with the driving plate 61, so that even if the actuator motor 72 is faulty and cannot work normally, the driven plate 62 and the driving plate 61 can maintain in the jointed state under the elastic force of the elastic member 73. This can avoid an accident caused when the clutch 6 is in the intermediate state between the jointed state and the separated state, to ensure safe driving of the automobile.

In embodiments of this disclosure, the clutch is mounted between the gear mechanism and the differential of the powertrain. When the drive motor is used as the power source to drive the automobile to run, the driven plate of the clutch may slide to the driving plate, so that the clutch is in the jointed state, and the drive motor can transfer power to the left half shaft and the right half shaft to drive the automobile to run. When the automobile is in the coasting phase and the drive motor is not required to drive the automobile to run, the driven plate of the clutch slides away from the driving plate, so that the clutch is in the separated state. In this state, although the left half shaft and the right half shaft are in the rotating state, because the clutch disables power transmission between the drive motor and the differential, the left half shaft and the right half shaft can be blocked from transmitting power to the drive motor, so that the drive motor can be prevented from blocking driving of the automobile as resistance. It can be learned that the powertrain having this structure can improve the driving effect of the powertrain.

This embodiment further provides a drive system of an automobile. The drive system may include at least one powertrain described above. For example, a dual-motor four-wheel drive system driven by two drive motors may include two powertrains described above, and a drive system driven by more than two drive motors may include a plurality of powertrains described above.

The powertrain of the drive system is as described above. A clutch is mounted between a gear mechanism and a differential of the powertrain. When a drive motor is used as a power source to drive the automobile to run, a driven plate of the clutch may slide to a driving plate, so that the clutch is in a jointed state, and the drive motor can transfer power to a left half shaft and a right half shaft to drive the automobile to run. When the automobile is in a coasting phase and the drive motor is not required to drive the automobile to run, the driven plate of the clutch slides away from the driving plate, so that the clutch is in a separated state. In this state, although the left half shaft and the right half shaft are in a rotating state, because the clutch disables power transmission between the drive motor and the differential, the left half shaft and the right half shaft can be blocked from transmitting power to the drive motor, so that the drive motor can be prevented from blocking driving of the automobile as resistance. It can be learned that the powertrain having this structure can improve a driving effect of the powertrain.

An embodiment further provides an automobile, for example, an electric automobile. The automobile may include the foregoing drive system. As described above, the drive system may include the foregoing at least one powertrain. For example, a dual-motor four-wheel drive system driven by two drive motors may include two powertrains described above, and a drive system driven by more than two drive motors may include a plurality of powertrains described above.

The powertrain is as described above. A clutch is mounted between a gear mechanism and a differential of the powertrain. When a drive motor is used as a power source to drive the automobile to run, a driven plate of the clutch may slide to a driving plate, so that the clutch is in a jointed state, and the drive motor can transfer power to a left half shaft and a right half shaft to drive the automobile to run. When the automobile is in a coasting phase and the drive motor is not required to drive the automobile to run, the driven plate of the clutch slides away from the driving plate, so that the clutch is in a separated state. In this state, although the left half shaft and the right half shaft are in a rotating state, because the clutch disables power transmission between the drive motor and the differential, the left half shaft and the right half shaft can be blocked from transmitting power to the drive motor, so that the drive motor can be prevented from blocking driving of the automobile as resistance. It can be learned that the powertrain having this structure can improve a driving effect of the powertrain.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A powertrain, comprising:
    a drive motor comprising an output shaft;
    a differential comprising a left gear, a right gear, and a housing, wherein the housing comprises an outer surface;
    a gear mechanism configured to connect to the output shaft via a transmission, wherein the gear mechanism is mounted on the differential via a bearing;
    a left half shaft in transmission connection to the left gear;
    a right half shaft in transmission connection to the right gear;
    a clutch comprising:
        a driving plate located between the gear mechanism and the differential, wherein the driving plate is fixedly mounted on the gear mechanism, and wherein the driving plate is sleeved on the outer surface of the housing; and
        a driven plate that is slidably sleeved on the outer surface, wherein a sliding direction of the driven plate relative to the differential is in an axial direction of the differential; and
    a clutch control component comprising:
        an annular sliding member mounted on the driven plate and comprising:
            a first ring comprising an arc-shaped groove on an outer surface of the first ring along a circumferential direction, wherein the first ring is sleeved on an outer surface of the driven plate;
            an arc-shaped shift fork configured to adapt to the arc-shaped groove, wherein the arc-shaped shift fork is mounted in the arc-shaped groove; and
            a sliding block rotatably mounted on a second output shaft of an actuator motor, wherein the arc-shaped shift fork is fastened to the sliding block;
        an elastic member configured to control the driving plate and the driven plate to be maintained in a jointed state or a separated state; and
        the actuator motor comprising the second output shaft, wherein the annular sliding member is rotatably mounted on the second output shaft,
        wherein the clutch control component is configured to:
            control the driven plate to slide in the sliding direction close to the driving plate and on the housing and to engage the driven plate with the driving plate so as to pass on power output from the drive motor to the differential; and
            control the driven plate to slide in the sliding direction away from the driving plate on the housing of the differential and to separate the driven plate from the driving plate so as to disconnect the power output transmitted from the drive motor to the differential.

2. The powertrain of claim 1, wherein the an actuator motor comprises the second output shaft, wherein the annular sliding member is rotatably mounted on the second output shaft, and wherein the clutch control component is configured to:
    control, via the annular sliding member when the actuator motor rotates in a first rotation direction, the driven plate to slide in the sliding direction close to the driving plate and on the housing when the actuator motor rotates in the first rotation direction, and to engage the driving plate with the driven plate so as to pass on the power output from the drive motor to the differential; and
    control, via the annular sliding member when the actuator motor rotates in a second rotation direction, the driven plate to slide in the sliding direction away from the driving plate on the housing of the differential, and to separate the driving plate from the driven plate so as to disconnect the power output transmitted from the drive motor to the differential, wherein the second rotation direction is opposite to the first rotation direction.

3. The powertrain of claim 1, wherein the elastic member comprises:
    a first end that abuts against the driven plate; and
    a second end that abuts against the housing.

4. The powertrain of claim 1, wherein the clutch is a claw type clutch, and wherein a plurality of first claw teeth are disposed on first end surfaces of the driving plate and a plurality of second claw teeth are disposed on second end surfaces of the driven plate, wherein the first end surfaces face the second end surfaces, wherein the driving plate and the driven plate are configured to be in the jointed state when the first claw teeth are engaged with the second claw teeth, and wherein the driving plate and the driven plate are configured to be in the separated state when the first claw teeth are not in contact with the second claw teeth.

5. The powertrain of claim 1, wherein the housing comprises an axial chute, wherein the driven plate comprises an axial protrusion that is disposed on an inner wall of the driven plate, and wherein the driven plate is slidably sleeved on the housing through cooperation between the axial protrusion and the axial chute.

6. The powertrain of claim 1, wherein the actuator motor is configured to be, when the elastic member is configured to control the driving plate and the driven plate to maintain in the jointed state, in a running state when the driving plate and the driven plate are in the separated state, to control the driving plate and the driven plate to maintain in the separated state.

7. The powertrain of claim 1, wherein the actuator motor is configured to be, when the elastic member is configured to control the driving plate and the driven plate to maintain in the separated state, in a running state when the driving plate and the driven plate are in the jointed state, to control the driving plate and the driven plate to maintain in the jointed state.

8. A drive system, comprising:
    at least one powertrain, comprising:
        a drive motor comprising an output shaft;
        a differential comprising a left gear, a right gear, and a housing, wherein the housing comprises an outer surface;
        a gear mechanism configured to connect to the output shaft via a transmission, wherein the gear mechanism is mounted on the differential via a bearing;
        a left half shaft in transmission connection to the left gear;
        a right half shaft in transmission connection to the right gear;
        a clutch comprising:
            a driving plate located between the gear mechanism and the differential, wherein the driving plate is fixedly mounted on the gear mechanism, and wherein the driving plate is sleeved on the outer surface; and
            a driven plate that is slidably sleeved on the outer surface of the housing, wherein a sliding direction of the driven plate relative to the differential is in an axial direction of the differential; and a clutch control component comprising:
an annular sliding member mounted on the driven plate and comprising:
a first ring comprising an arc-shaped groove on an outer surface of the first ring along a circumferential direction, wherein the first ring is sleeved on an outer surface of the driven plate;
an arc-shaped shift fork configured to adapt to the arc-shaped groove, wherein the arc-shaped shift fork is mounted in the arc-shaped groove; and
a sliding block rotatably mounted on a second output shaft of an actuator motor, wherein the arc-shaped shift fork is fastened to the sliding block;
an elastic member configured to control the driving plate and the driven plate to be maintained in a jointed state or a separated state; and
the actuator motor comprising the second output shaft, wherein the annular sliding member is rotatably mounted on the second output shaft,
wherein the clutch control component is configured to:
control the driven plate to slide in the sliding direction close to the driving plate and on the housing and to engage the driven plate with the driving plate so as to pass on power output from the drive motor to the differential; and
control the driven plate to slide in the sliding direction away from the driving plate on the housing of the differential and to separate the driven plate from the driving plate so as to disconnect the power output transmitted from the drive motor to the differential.

9. The drive system of claim 8, wherein the comprises the second output shaft, wherein the annular sliding member is rotatably mounted on the second output shaft, wherein the clutch control component is configured to:
control, via the annular sliding member when the actuator motor rotates in a first rotation direction, the driven plate to slide in the sliding direction close to the driving plate and on the housing when the actuator motor rotates in the first rotation direction, and to engage the driving plate with the driven plate so as to pass on the power output from the drive motor to the differential; and
control, via the annular sliding member when the actuator motor rotates in a second rotation direction, the driven plate to slide in the sliding direction away from the driving plate on the housing of the differential, and to separate the driving plate from the driven plate so as to disconnect the power output transmitted from the drive motor to the differential, wherein the second rotation direction is opposite to the first rotation direction.

10. The drive system of claim 8, wherein the elastic member comprises:
a first end that abuts against the driven plate; and
a second end that abuts against the housing.

11. The drive system of claim 8, wherein the clutch is a claw type clutch, and wherein a plurality of first claw teeth are disposed on first end surfaces of the driving plate and a plurality of second claw teeth are disposed on second end surfaces of the driven plate, wherein the first end surfaces face the second end surfaces, wherein the driving plate and the driven plate are in the jointed state when the first claw teeth are engaged with the second claw teeth, and wherein the driving plate and the driven plate are in the separated state when the first claw teeth are not in contact with the second claw teeth.

12. The drive system of claim 8, wherein the housing comprises an axial chute, wherein the driven plate comprises an axial protrusion that is disposed on an inner wall of the driven plate, and wherein the driven plate is slidably sleeved on the housing through cooperation between the axial protrusion and the axial chute.

13. The drive system of claim 8, wherein the actuator motor is configured to be, when the elastic member is configured to control the driving plate and the driven plate to maintain in the jointed state, in a running state when the driving plate and the driven plate are in the separated state, to control the driving plate and the driven plate to maintain in the separated state.

14. The drive system of claim 8, wherein the actuator motor is configured to be, when the elastic member is configured to control the driving plate and the driven plate to maintain in the separated state, in a running state when the driving plate and the driven plate are in the jointed state, to control the driving plate and the driven plate to maintain in the jointed state.

15. An automobile comprising:
a drive system comprising at least one powertrain, wherein the at least one powertrain comprises:
a drive motor comprising an output shaft;
a differential comprising a left gear, a right gear, and a housing;
a gear mechanism in transmission connection to the output shaft, wherein the gear mechanism is mounted on the differential via a bearing;
a left half shaft in transmission connection to the left gear;
a right half shaft in transmission connection to the right gear;
a clutch comprising:
a driving plate located between the gear mechanism and the differential, wherein the driving plate is fixedly mounted on the gear mechanism, and wherein the driving plate is sleeved on an outer surface of the housing; and
a driven plate that is slidably sleeved on the outer surface of the housing, wherein a sliding direction of the driven plate relative to the differential is an axial direction of the differential; and
a clutch control component comprising:
an annular sliding member mounted on the driven plate and comprising:
a first ring comprising an arc-shaped groove on an outer surface of the first ring along a circumferential direction, wherein the first ring is sleeved on an outer surface of the driven plate;
an arc-shaped shift fork configured to adapt to the arc-shaped groove, wherein the arc-shaped shift fork is mounted in the arc-shaped groove; and
a sliding block rotatably mounted on a second output shaft of an actuator motor, wherein the arc-shaped shift fork is fastened to the sliding block,
an elastic member configured to control the driving plate and the driven plate to be maintained in a jointed state or a separated state; and
the actuator motor comprising the second output shaft, wherein the annular sliding member is rotatably mounted on the second output shaft,
wherein the clutch control component is configured to:
control the driven plate to slide in the sliding direction close to the driving plate and on the housing and to engage the driven plate with the driving plate so as to pass on power output from the drive motor to the differential; and control the driven plate to slide in the sliding direction away from the driving plate on the housing of the differential and to separate the driven plate from the driving plate so as to disconnect the power output transmitted from the drive motor to the differential.

16. The automobile of claim 15, wherein the clutch control component further comprises: an annular sliding member mounted on the driven plate; and an actuator motor comprising comprises a second output shaft, wherein the annular sliding member is rotatably mounted on the second output shaft, wherein the clutch control component is configured to:

control, via the annular sliding member when the actuator motor rotates in a first rotation direction, the driven plate to slide in the sliding direction close to the driving plate and on the housing when the actuator motor rotates in the first rotation direction, and to engage the driving plate with the driven plate so as to pass on the power output from the drive motor to the differential; and control, via the annular sliding member when the actuator motor rotates in a second rotation direction, the driven plate to slide in the sliding direction away from the driving plate on the housing of the differential, and to separate the driving plate from the driven plate so as to disconnect the power output transmitted from the drive motor to the differential, wherein the second rotation direction is opposite to the first rotation direction.

17. The automobile of claim 15, wherein the elastic member comprises:

a first end that abuts against the driven plate; and a second end that abuts against the housing.

18. The automobile of claim 15, wherein the clutch is a claw type clutch, and wherein a plurality of first claw teeth are disposed on first end surfaces of the driving plate and a plurality of second claw teeth are disposed on second end surfaces of the driven plate, wherein the first end surfaces face the second end surfaces, wherein the driving plate and the driven plate are configured to be in the jointed state when the first claw teeth are engaged with the second claw teeth, and wherein the driving plate and the driven plate are configured to be in the separated state when the first claw teeth are not in contact with the second claw teeth.

19. The automobile of claim 15, wherein the actuator motor is configured to be, when the elastic member is configured to control the driving plate and the driven plate to maintain in the jointed state, in a running state when the driving plate and the driven plate are in the separated state, to control the driving plate and the driven plate to maintain in the separated state.

20. The automobile of claim 15, wherein the actuator motor is configured to be, when the elastic member is configured to control the driving plate and the driven plate to maintain in the separated state, in a running state when the driving plate and the driven plate are in the jointed state, to control the driving plate and the driven plate to maintain in the jointed state.

* * * * *

UNITED STATES PATENT AND TRADEMARK OFFICE
CERTIFICATE OF CORRECTION

PATENT NO. : 12,025,213 B2  
APPLICATION NO. : 17/837488  
DATED : July 2, 2024  
INVENTOR(S) : Fengyu Liu, Yihong Zheng and Gongchuan Xia It is certified that error appears in the above-identified patent and that said Letters Patent is hereby corrected as shown below:

In the Claims

Claim 16, Column 27, Lines 10-12: "wherein the clutch control component further comprises: an annular slicing member mounted on the driven plate; and an actuator motor" should read "wherein the actuator motor"

Claim 16, Column 27, Line 13: "comprising comprises a second" should read "comprises a second"

Signed and Sealed this  
Sixth Day of August, 2024

Katherine Kelly Vidal  
*Director of the United States Patent and Trademark Office*